(12) United States Patent
Kim et al.

(10) Patent No.: US 12,196,944 B2
(45) Date of Patent: Jan. 14, 2025

(54) IMAGING SYSTEM FOR LEAK DETECTION

(71) Applicant: Kimball Electronics Indiana, Inc., Jasper, IN (US)

(72) Inventors: Sangtaek Kim, Dublin, CA (US); Yan Cheng, San Jose, CA (US); Paul Brunemeier, Sunnyvale, CA (US); Athinarayanan Sankaranarayanan, Tamilnadu State (IN)

(73) Assignee: Kimball Electronics Indiana, Inc., Jasper, IN (US)

( * ) Notice: Subject to any disclaimer, the term of this patent is extended or adjusted under 35 U.S.C. 154(b) by 282 days.

(21) Appl. No.: 17/134,918

(22) Filed: Dec. 28, 2020

(65) Prior Publication Data
US 2021/0215925 A1 Jul. 15, 2021

Related U.S. Application Data

(60) Provisional application No. 62/958,764, filed on Jan. 9, 2020.

(51) Int. Cl.
*G02B 23/12* (2006.01)
*G02B 27/30* (2006.01)
*H04N 23/57* (2023.01)

(52) U.S. Cl.
CPC ............ *G02B 23/12* (2013.01); *G02B 27/30* (2013.01); *H04N 23/57* (2023.01)

(58) Field of Classification Search
CPC ......... G02B 23/12; G02B 27/30; H04N 23/57
(Continued)

(56) References Cited

U.S. PATENT DOCUMENTS 4,188,117 A * 2/1980 Yamauchi ............ B01D 65/104
356/237.1
5,309,222 A 5/1994 Kamei et al.
(Continued)

FOREIGN PATENT DOCUMENTS

CN 1977144 A 6/2007
CN 200944170 Y 9/2007
(Continued)

OTHER PUBLICATIONS

Kolhe; Density Measurements in a Supersonic Microjet Using Miniature Rainbow Schlieren Deflectometry Pankaj S. Kolhe and Ajay K. Agrawal University of Alabama, Tuscaloosa, Alabama 35487; AIAA Journal vol. 47, No. 4, Apr. 2009.*
(Continued)

*Primary Examiner* — Sharrief I Broome
(74) *Attorney, Agent, or Firm* — Faegre Drinker Biddle & Reath LLP

(57) ABSTRACT

An imaging system and method for leakage detection uses schlieren imaging to locate and characterize a flow of pressurized gas with a refractive index different than ambient air. In particular, a schlieren imaging system includes a collimated light, a knife-edge spatial filter and a 4F telescopic imaging system is used to create an image of a device under test (DUT). The DUT is pressurized and monitored for leaks. When a leak is present and in the monitored plane of the DUT, contrast variation illustrates the presence, location and character of the leak. For example, a waterproof/leak-proof mobile device may be evaluated for leakage between layers of modules, such as leaks in the housing of a waterproof electronics case. This detection can allow identification and characterization of the leak point via visual identification.

18 Claims, 28 Drawing Sheets

(58) Field of Classification Search
USPC .......................................................... 359/399
See application file for complete search history.

(56) References Cited

U.S. PATENT DOCUMENTS

| | | | |
|---|---|---|---|
| 6,181,416 | B1 | 1/2001 | Falk |
| 6,847,458 | B2 | 1/2005 | Freischlad et al. |
| 7,535,562 | B2 | 5/2009 | Matsui et al. |
| 7,570,366 | B2 | 8/2009 | LeBlanc |
| 7,796,273 | B2 | 9/2010 | Deck |
| 10,042,173 | B2 | 8/2018 | Hung et al. |
| 2002/0118370 | A1 | 8/2002 | Nishida |
| 2002/0145739 | A1 | 10/2002 | De et al. |
| 2002/0167674 | A1 | 11/2002 | Yoshizumi et al. |
| 2005/0036153 | A1* | 2/2005 | Joannes .................. G02B 27/54 |
| | | | 356/518 |
| 2005/0167620 | A1 | 8/2005 | Cho et al. |
| 2006/0139656 | A1 | 6/2006 | Kulawiec et al. |
| 2008/0198366 | A1* | 8/2008 | LeBlanc ............ G01B 11/2441 |
| | | | 356/497 |
| 2008/0285019 | A1 | 11/2008 | Williby et al. |
| 2011/0116257 | A1 | 5/2011 | Eisenberg et al. |
| 2012/0147379 | A1 | 6/2012 | Choi et al. |
| 2013/0314700 | A1 | 11/2013 | Suzuki et al. |
| 2014/0313517 | A1 | 10/2014 | Vankerkhove |
| 2015/0192769 | A1 | 7/2015 | Dresel et al. |
| 2019/0109995 | A1* | 4/2019 | Higurashi ............. G02B 21/244 |
| 2019/0316898 | A1 | 10/2019 | Kim et al. |
| 2019/0383697 | A1* | 12/2019 | Yang .................. G01M 11/0285 |
| 2020/0049492 | A1 | 2/2020 | Kim et al. |
| 2020/0408730 | A1* | 12/2020 | Nakamura ......... G01N 33/0067 |
| 2021/0042909 | A1 | 2/2021 | Cheng et al. |

FOREIGN PATENT DOCUMENTS

| | | | |
|---|---|---|---|
| CN | 100552376 | C | 10/2009 |
| CN | 101604093 | A | 12/2009 |
| CN | 101680742 | A | 3/2010 |
| CN | 203432964 | U | 2/2014 |
| CN | 103712573 | A | 4/2014 |
| CN | 103884486 | A | 6/2014 |
| CN | 104155071 | A | 11/2014 |
| CN | 105468185 | A | 4/2016 |
| CN | 109141835 | A | 1/2019 |
| EP | 1153263 | | 11/2001 |
| JP | 53-134776 | A | 11/1978 |
| JP | 63273031 | A * | 8/1988 |
| JP | 02-138845 | A | 5/1990 |
| JP | 02-242103 | A | 9/1990 |
| JP | 03-051737 | A | 3/1991 |
| JP | 06-003625 | A | 1/1994 |
| JP | 06-066537 | A | 3/1994 |
| JP | 06-221955 | A | 8/1994 |
| JP | 2008-076962 | A | 4/2008 |
| JP | 2012-208181 | A | 10/2012 |
| JP | 2015-021778 | A | 2/2015 |
| JP | 2017-505434 | A | 2/2017 |
| JP | 2018-031716 | A | 3/2018 |
| KR | 10-2012-0006452 | A | 1/2012 |
| KR | 10-2016-0015321 | A | 2/2016 |
| TW | 200902960 | A | 1/2009 |
| TW | I401408 | B | 7/2013 |
| TW | I401414 | B | 7/2013 |
| TW | I596448 | B | 8/2017 |
| TW | I660212 | B | 5/2019 |
| WO | 90/09571 | A1 | 8/1990 |
| WO | 00/49364 | | 8/2000 |
| WO | 01/51886 | A1 | 7/2001 |
| WO | 2003/048837 | A2 | 6/2003 |

OTHER PUBLICATIONS

JP-63273031 English.*
Kolhe et al., "Density Measurements in a Supersonic Microjet Using Miniature Rainbow Schlieren Deflectometry", AIAA Journal, vol. 47, No. 4, Apr. 2009, pp. 830-838.
Notice of Preliminary Rejection dated Jul. 29, 2020 in corresponding Korean Patent Application No. 10-2019-0088184.
Office Action dated Jun. 11, 2020 in corresponding Taiwan Patent Application No. 108123580.
Settles et al., "Imaging Gas Leaks by Using Schlieren Optics", Pipeline & Gas Journal, vol. 226, No. 9, 1999, pp. 28-30.
Settles et al., "A review of recent developments in schlieren and shadowgraph techniques", Measurement Science and Technology, vol. 28, 2017, 25 pages.

* cited by examiner

IMAGING SYSTEM FOR LEAK DETECTION

CROSS-REFERENCE TO RELATED APPLICATION

This application claims the benefit under Title 35, U.S.C. § 119(e) of U.S. Provisional Patent Application Ser. No. 62/958,764, entitled IMAGING SYSTEM FOR LEAK DETECTION, filed on Jan. 9, 2020, the entire disclosure of which is hereby expressly incorporated herein by reference.

BACKGROUND

1. Technical Field

The present application relates to testing for and detecting leakage in hermetically sealed devices, and more specifically to evaluation of the water- and air-tightness of leakproof device modules or assemblies.

2. Description of the Related Art

Mobile devices, such as cellular phones and tablets, are often protected from water damage and/or contamination by leakproof cases. In some instances, such cases may be integrated into the mobile device by the device manufacturer. However, damage to casing components, misapplication of sealant or adhesive, or other manufacturing irregularities can cause otherwise "waterproof" or "leakproof" outer or inner casings to fail.

For the casings of mobile devices, the cover glass, display module and frames are usually adhered together. Detection of leakage in assembled casings is important to guarantee the performance and integrity of the final product, and also for detecting and correcting errors in the manufacturing process (e.g., by determining which layer or component is creating the leak).

Efforts at leakage detection have included micro-scale mechanical structures to develop a gas "sniffing" method of detection, in which a leak is detected by detecting the presence and concentration of a particular gas. However, the gas may diffuse and/or dilute or present in small, undetectable flows, thereby impeding the precise location and character of the leak. Moreover, "sniffer" devices are generally too large for use in detecting leaks on a small scale, such as in mobile devices.

What is needed is an improvement over the foregoing.

SUMMARY

The present disclosure is directed to an imaging system and method for leakage detection using Schlieren imaging to locate and characterize a flow of pressurized gas with a refractive index different than ambient air. In particular, a schlieren imaging system includes a collimated light, a knife-edge spatial filter and a 4F telescopic imaging system to create an image of a device under test (DUT). The DUT is pressurized and monitored for leaks. When a leak is present and in the monitored plane including the DUT, contrast variation illustrates the presence, location and character of the leak. For example, a waterproof/leakproof mobile device may be evaluated for leakage between layers of modules, such as leaks in the housing of a waterproof electronics case. This detection can allow identification and characterization of the leak point via visual identification.

In one embodiment, the present disclosure provides an imaging system including a point light source configured to emit a light signal, a parabolic collimation mirror positioned to receive the light signal the parabolic collimation mirror configured to emit a collimated light signal, a parabolic collection mirror positioned to receive the collimated light signal, a spatial filter positioned at a Fourier plane of the parabolic collection mirror, the spatial filter configured to pass a filtered light signal, an image sensor positioned at an output side of the parabolic collection mirror, such that the image sensor is positioned to receive the filtered light signal, a device under test positioned at an object plane between the parabolic collimation mirror and the parabolic collection mirror, and a source of pressurized gas configured to pressurize an interior volume of the device under test, whereby the imaging system is configured to optically detect a leak of the pressurized gas from the device under test.

In aspects, the imaging system may include a gas with a refractive index different than ambient air. The device under test may be configured as a hermetically sealed device. The light signal is an incoherent light signal, such as a signal emitted by a light-emitting diode. The light may be a coherent light signal, such as a light signal is emitted by a laser.

In additional aspects, the image sensor may be an imaging device operably connected to a controller programmed to evaluate a detected image to determine the presence of a leak by assessing the presence or absence of contrast variation in the detected image. The controller may evaluate a detected image utilizing machine learning methods, such as evaluating a detected image as a machine learning regression problem. The controller may evaluate a detected image utilizing deep learning methods, such as evaluating a detected image as a deep learning classification problem. The controller may evaluate a detected image as a deep learning detector problem, such as evaluating a detected image as a deep learning segmentation problem.

In another embodiment, the present disclosure provides a method for evaluating leaks in a device, including emitting a light signal, modifying the light signal to create a collimated light signal, filtering the light signal to create a filtered light signal, sensing the filtered light signal to create a sensed image, placing a device under test in an object plane along the collimated light signal such that an image of the device under test appears in the sensed image, directing a pressurized gas into an interior volume of the device under test, evaluating contrast in the sensed image, and based on the step of evaluating contrast, determining whether the pressurized gas is leaking from the interior volume of the device under test.

In aspects, the method may include pressurized gas having a refractive index different than ambient air. The method may further include determining the magnitude and character of the leak in the device under test based on the contrast in the sensed image. The device under test may be configured to be a hermetically sealed device. The step of emitting the light signal may include emitting an incoherent light signal. The step of emitting the light signal may include emitting a coherent light signal. The step of sensing the filtered light signal to create the sensed image may include capturing the sensed image with an image sensor. The step of evaluating contrast in the sensed image may be performed by a controller operably connected to the image sensor.

In yet another embodiment, the present disclosure provides a method for evaluating a detected image, including receiving a background-subtracted image, applying image metrices to measure and analyze the background subtracted image, recording and storing image measurements and analytics, and classifying aspects of the background subtracted image based on image metrices applied and measurements received.

In aspects, the method may include dividing the background subtracted image into regions of interest and regions of non-interest. The classifying step may include predicting labels such as no leak, small leak, or large leak. The classifying step may include predicting leaky regions. The method may include dividing the background subtracted image into grids. The applying step may include analyzing the background subtracted image as a regression problem. The applying step may include utilizing a machine learning method. The applying step may include utilizing a deep learning method, such as analyzing the background subtracted image as a classification problem. The applying step may include analyzing the background subtracted image as a detection problem. The applying step may include analyzing the background subtracted image as a segmentation problem, such as by predicting leaky regions.

In still another embodiment, the present disclosure provides an imaging system including a point light source configured to emit a light signal, a collimation lens positioned to receive the light signal. The collimation lens configured to emit a collimated light signal. The system also includes a 4F imaging telescope positioned to receive the collimated light signal and a spatial filter positioned at a Fourier plane of the 4F imaging telescope, the spatial filter configured to pass a filtered light signal. The system further includes an image sensor positioned at an output side of the 4F imaging telescope, such that the image sensor is positioned to receive the filtered light signal. A device under test is positioned at an object plane between the collimation lens and the 4F imaging telescope, and a source of pressurized gas is configured to pressurize an interior volume of the device under test, the imaging system configured to detect a leak of the pressurized gas from the device under test. In this way, the imaging system is configured to provide optical leak detection for the device under test In aspects, the gas may have a refractive index different than ambient air. The device under test may be configured as a hermetically sealed device. The spatial filter may be a knife-edge filter. The light signal may be an incoherent light signal, such as a light signal emitted by a light-emitting diode. The light signal may be a coherent light signal, such as a light signal emitted by a laser. The image sensor may be a camera.

In other aspects, the image sensor may be an imaging device operably connected to a controller. The controller may be programmed with processing instructions to evaluate a detected image to determine the presence of a leak by assessing the presence or absence of contrast variation in the detected image.

In yet another embodiment, the present disclosure provides a method for evaluating leaks in a device, including emitting a light signal, passing the light signal through a collimation lens to create a collimated light signal, passing the collimated light signal through a 4F imaging telescope and a spatial filter positioned at a Fourier plane of the 4F imaging telescope to create a filtered light signal, sensing the filtered light signal to create a sensed image, placing a device under test in an object plane between the collimation lens and the 4F imaging telescope such that an image of the device under test appears in the sensed image, and evaluating contrast in the sensed image to determine whether the device under test has a leak.

In aspects, the method can further include evaluating contrast in the sensed image to determine the magnitude and character of the leak in the device under test. The device under test may be configured as a hermetically sealed device. The step of emitting the light signal may include emitting an incoherent light signal. The step of emitting the light signal may include emitting a coherent light signal. The step of sensing the filtered light signal to create the sensed image may include capturing the sensed image with an image sensor. The step of evaluating contrast in the sensed image may be performed by a controller operably connected to the image sensor.

BRIEF DESCRIPTION OF THE DRAWINGS

The above mentioned and other features and objects of this invention, and the manner of attaining them, will become more apparent and the invention itself will be better understood by reference to the following description of embodiments of the invention taken in conjunction with the accompanying drawings, wherein.

Figure 1:
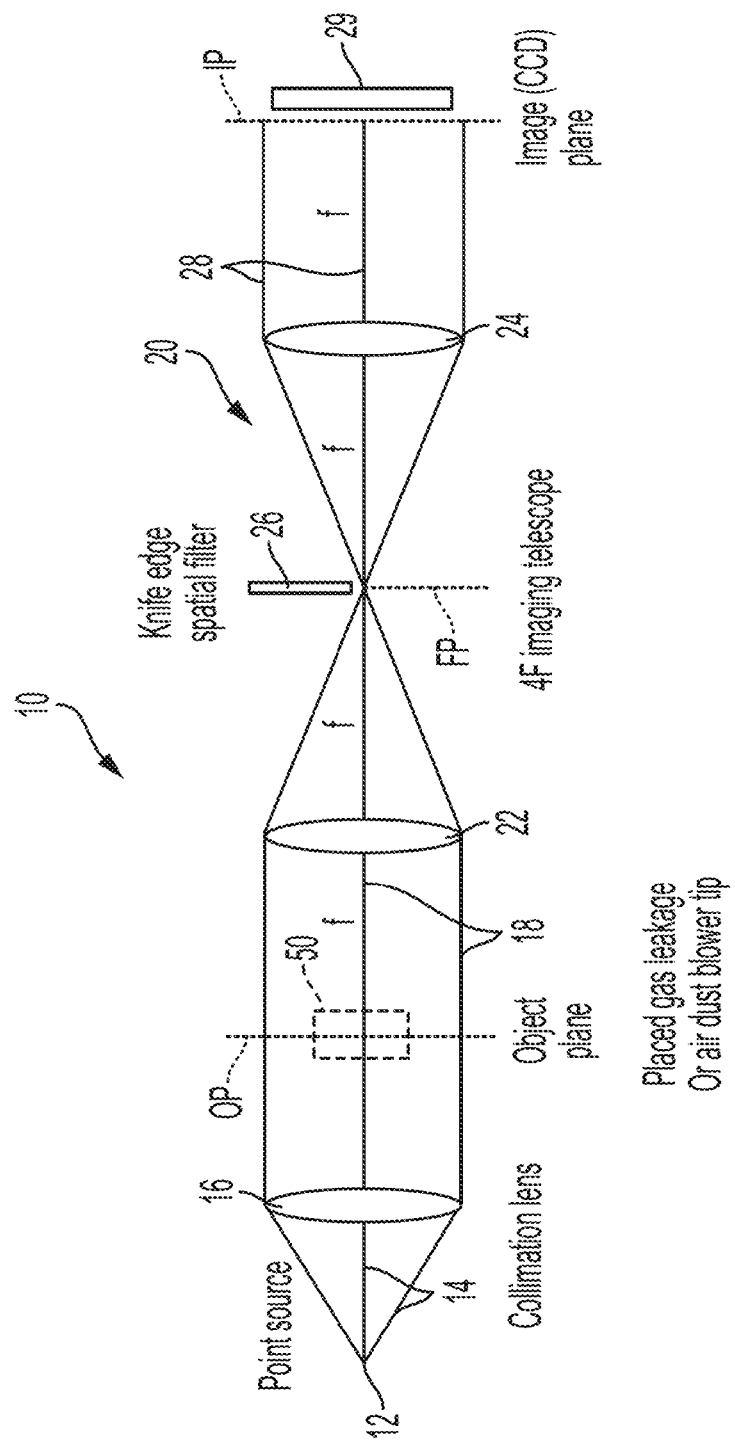
FIG. 1 is a schematic view of a leak detection system made in accordance with the present disclosure, utilizing a collimated light source and a 4F imaging telescope.

Corresponding reference characters indicate corresponding parts throughout the several views. Although the exemplifications set out herein illustrate embodiments of the invention, the embodiments disclosed below are not intended to be exhaustive or to be construed as limiting the scope of the invention to the precise form disclosed.

DETAILED DESCRIPTION

The present disclosure is directed to methods for inspecting and evaluating display modules using leak detection system 10, shown in FIG. 1, and other similarly arranged leak detection systems. As described in detail below, system 10 is a schlieren imaging system configured to generate an image of a plane in which a leak, which is a disruptive flow of gas through an otherwise uniform ambient atmosphere such as air, has a refractive index differential due to density variation arising from the composition, pressure, speed, and/or temperature of the leak flow. This refractive index differential causes the light rays projected by system 10 to change direction or phase. After proper spatial filtering, this difference can be observed as contrast variation which shows an optical "image" of a gas leak.

Figure 6:
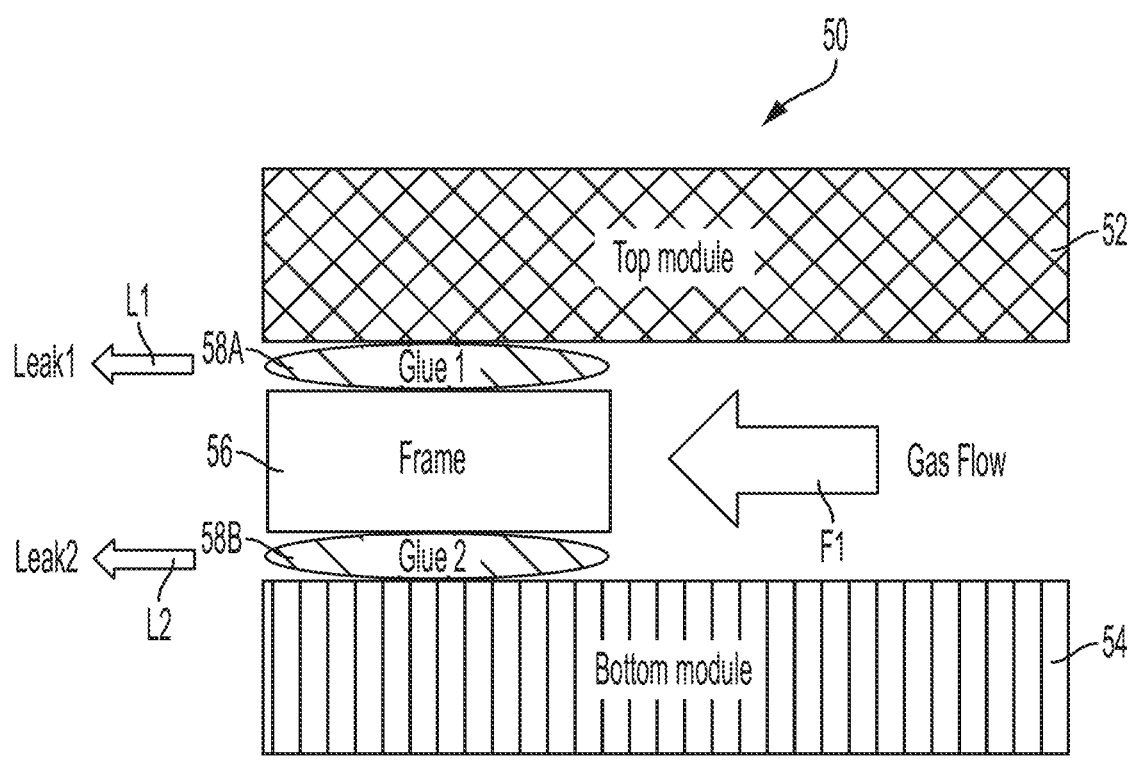
FIG. 6 is a schematic view of a pressurized device under test, showing leak paths detectable with a leak detection system in accordance with the present disclosure.

System 10 can be used to create an image which enables leak detection in two dimensions, showing leak position and character. Compared to conventional "sniffing" leak detection systems, the present system 10 and its method of use gives an evaluator precise leakage location information at the micron scale, which can in turn be used to check the seal quality of water/leak proof devices such as DUT 50 (FIG. 6).

As further described in detail below and shown in FIGS. 22-24, system 10' is an alternative imaging device which may be used interchangeably with system 10 to achieve the same overall result of leak detection and characterization. Descriptions herein pertaining to system 10 also apply to system 10', except as otherwise explicitly stated.

Referring to FIG. 1, leak detection system 10 includes a point light source 12 which issues a light signal 14 toward and through collimation lens 16. The signal 14 from light source 12 may be either coherent, such as a laser light signal, or incoherent, such as an incandescent or LED light signal. In the illustrated embodiment, light source 12 acts as a point source of light.

Collimation lens 16 issues collimated light signal 18 to 4F imaging telescope 20 via object plane OP, which is the plane of examination for a device under test (DUT) such as DUT 50 shown in FIG. 6 and further described below. 4F imaging telescope 20 includes telescope-type lenses 22 and 24 defining Fourier plane FP, and a filter 26 is placed coincident with plane FP.

Filter 26 is knife-edge or spatial filter which selectively blocks and passes spatial frequency information from the DUT, such that any index variation caused by a leak flow at object plane OP is detected as contrast variation in image plane IP. In particular, filter 26 passes filtered signal 28 which is received at image plane IP, which is at a location on an output side of telescope 20 (relative to light source 12). Image plane IP may include an imaging device 29, such as a camera or other imaging sensor. Signal 28 filters out some spatial frequency information from the incoming collimated light signal 18, thereby maximizing the contrast of the schlieren image received at image plane IP.

Figure 2:
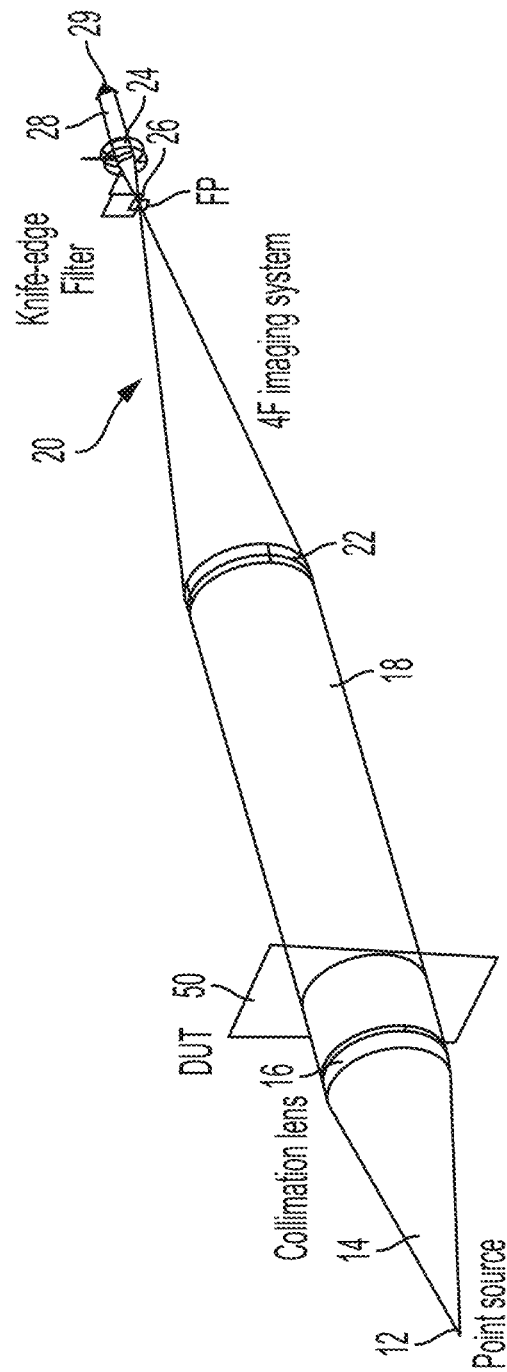
FIG. 2 is a perspective view of the leak detection system of FIG. 1, utilizing a collimated light source and a 4F imaging telescope.

As illustrated in FIG. 2, in one exemplary embodiment, 4F imaging telescope 20 provides varying magnification depending on a combination of focal lengths of lenses 22, 24, such that the area of inspection at object plane OP can be altered to view more or less surface area of the DUT. Collimation lens 16 collects and collimates light signal 14 from light source 12, which is incident on the DUT as back side illumination. 4F imaging system 20 images the DUT on image plane IP with filter 26, being a knife-edge filter as described above, at Fourier plane FP, which gives contrast variation in the image when the DUT has refractive index variation due to gas leakage.

In use, a device or module to be evaluated (the DUT) for leaks gas can be placed at the object plane OP and imaged by a camera or other imaging sensor placed at the image plane IP. For example and as further described below with respect to FIG. 6, the DUT may be a mobile phone or tablet having a thickness defined between its top (e.g., user-facing) and bottom layers. The DUT may be placed into object plane OP such that its thickness is in the viewing area, and leaks from the top layer, bottom layer or an intermediate layer may be detected.

Figure 3:
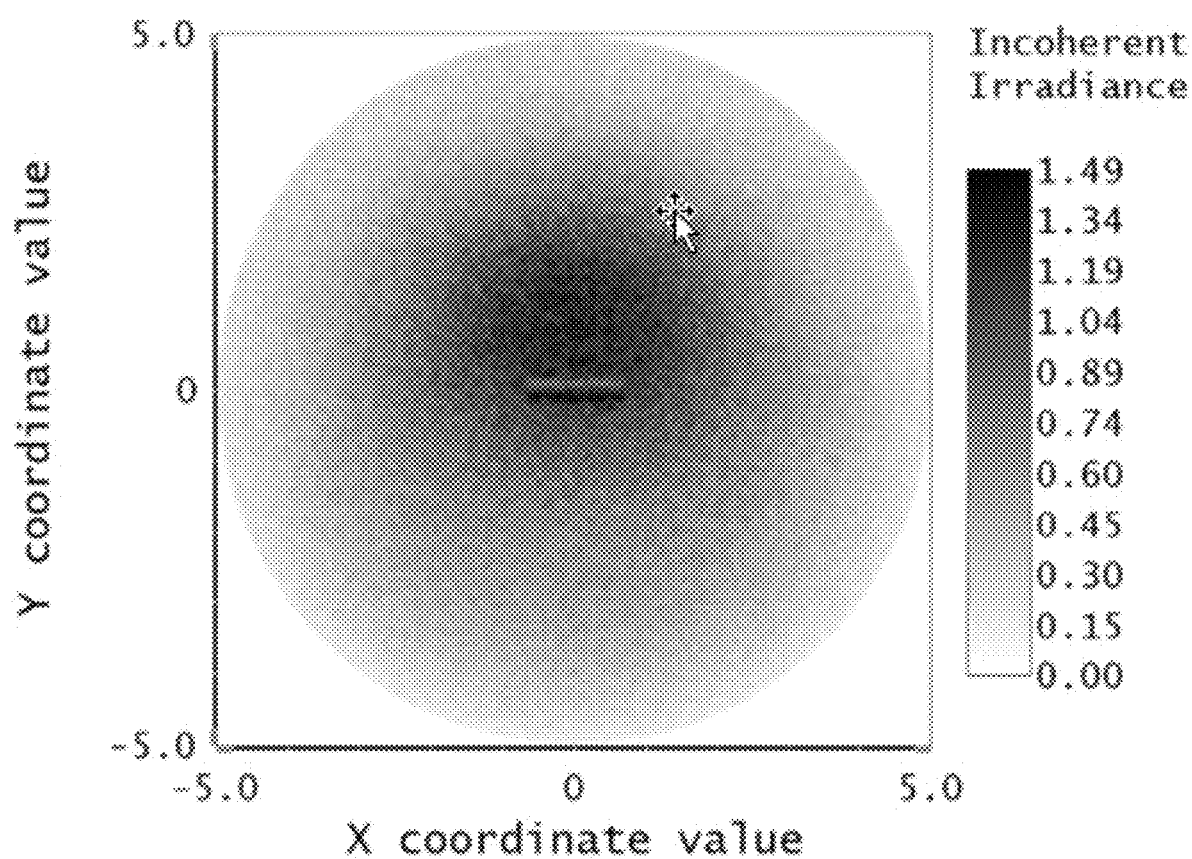
FIG. 3 is a photograph of a model, monitored via the leak detection system of FIG. 1 and showing small refractive index changes.

Turning now to FIG. 3, a photograph image shows simulation results of imaging when a gas leak is modelled by an object plane OP in a DUT with small refractive index changes, in which leak detection system 10 of FIG. 2 is used, as described above. As illustrated, spatial filtering clearly creates contrast variation in the image at the center of the image.

Figure 4:
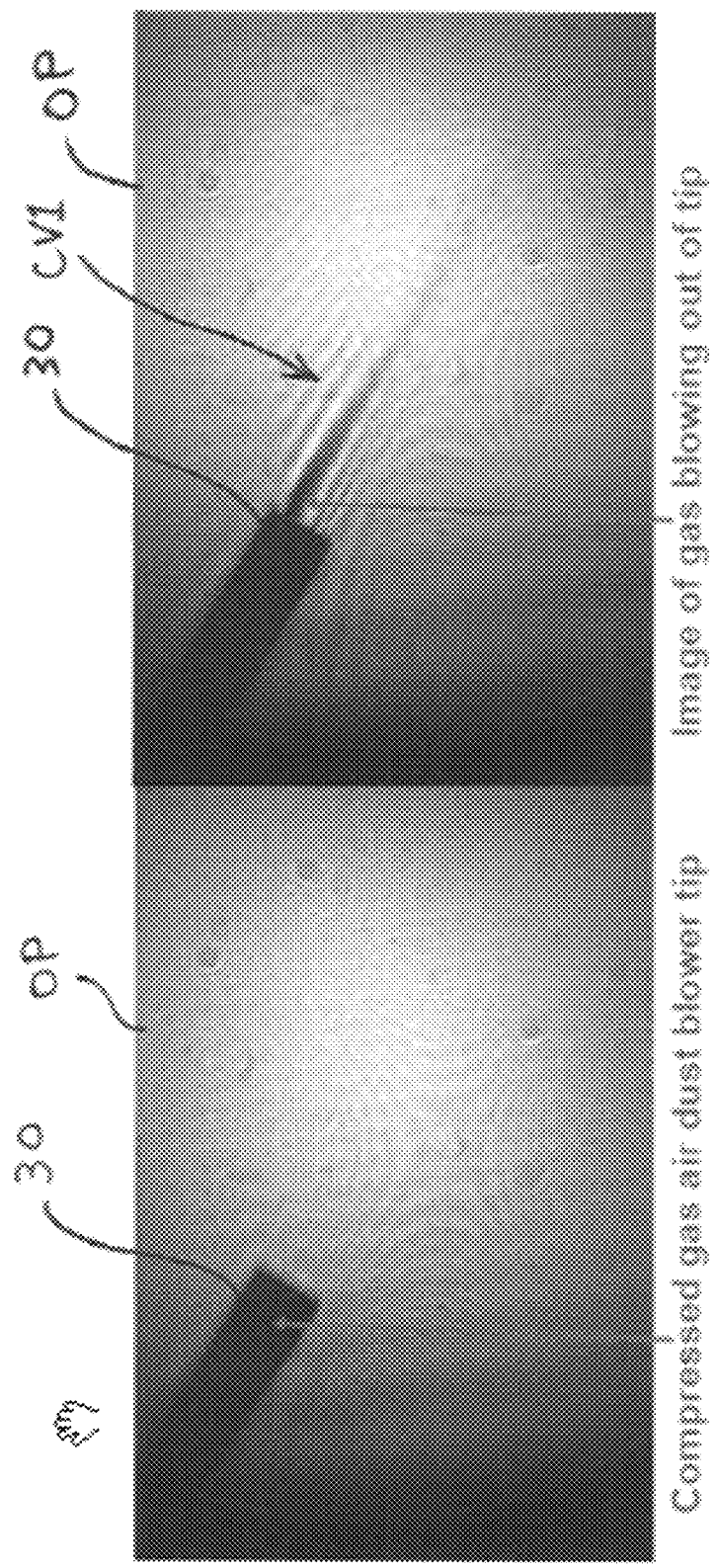
FIG. 4 a photograph of a difluoroethane nozzle monitored via a leak detection system in accordance with the present disclosure and utilizing a coherent laser light source, with the left image showing no gas flow and the right image showing gas flow.

Turning now to FIG. 4, a photograph image shows experimental results of imaging a gas flow with leak detection system 10, in which light source 12 is a coherent laser light source generating a coherent signal 14 with a 633 nm wavelength. Filter 26 was a knife-edge spatial filter at the Fourier plane FP of the 4F imaging telescope 20, as described above.

In this experiment, a tip 30 having a 1 mm diameter was placed at object plane OP. Tip 30 is the outlet end of an air dust blower conduit, with the inlet end (not shown) connected to a source of difluoroethane gas. At left is a captured image taken at image plane IP, in which the air dust blower was not activated and no difluoroethane gas was observed emanating from the tip 30. At right is another captured image taken at image plane IP, in which the air dust blower was activated such that difluoroethane gas was flowing from the tip 30. This flow of difluoroethane gas was clearly observed as a contrast variation CV1 in object plane OP, which was recorded at the image plane IP. From this experiment, it is shown that the location and extent of a leak of comparable magnitude from a device under test (DUT) would be similarly detectable by leak detection system 10.

Figure 5:
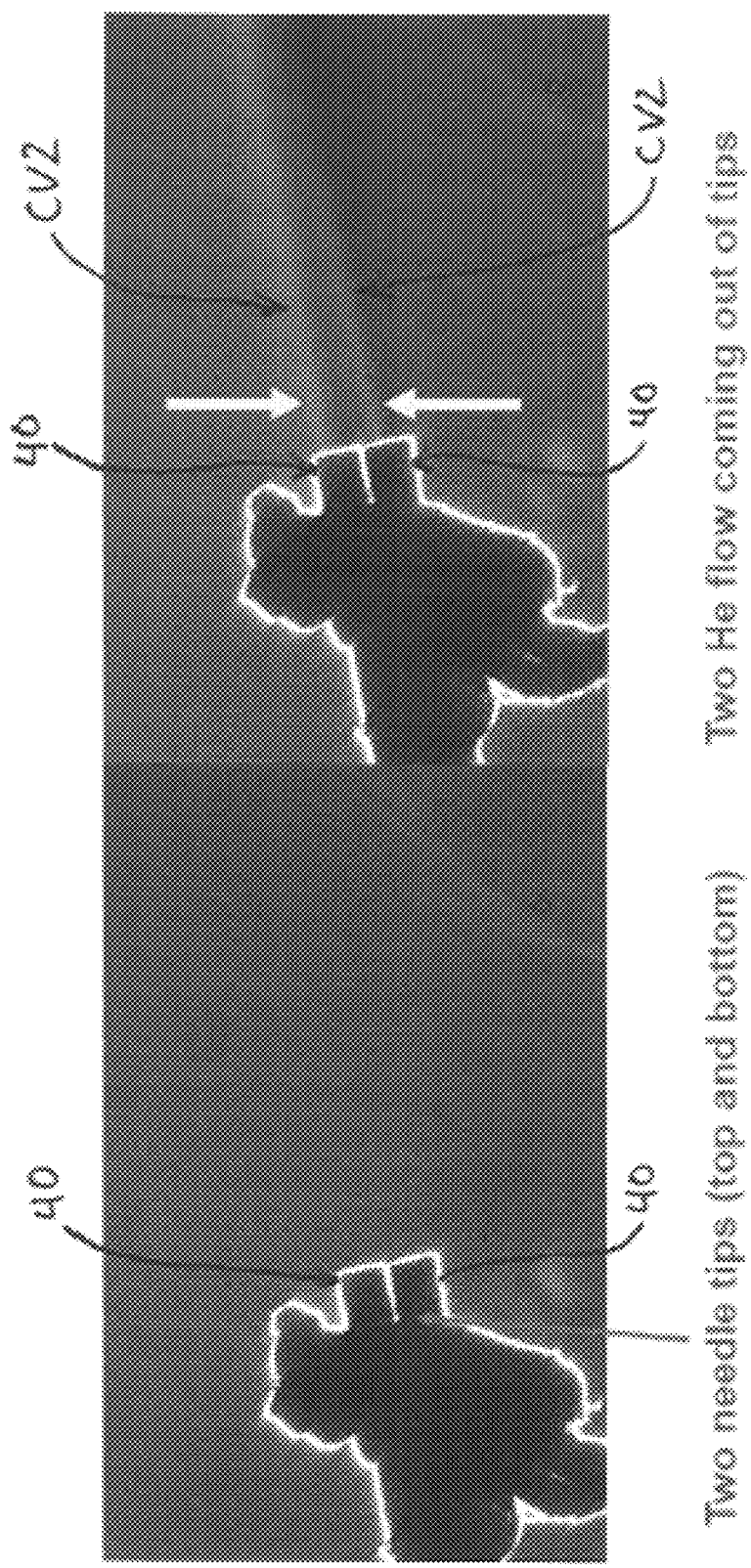
FIG. 5 is a photograph of a helium nozzle monitored via a leak detection system in accordance with the present disclosure and utilizing an incoherent laser light source, with the left image showing no gas flow and the right image showing gas flow.

FIG. 5 shows another pair of photograph images taken at image plane IP. In this experiment, a gas flow was imaged with leak detection system 10, using an incoherent light source 12. In particular, light source 12 was a white LED emitting incoherent light signal 14. Filter 26 was a knife-edge spatial filter at the Fourier plane FP of the 4F imaging system 20, as described above.

In this experiment, a tip 40 having a pair of gas needles each defining a 0.15 mm inner diameter, and separated by approximately 0.15 mm, was placed at object plane OP. Tip 40 is the outlet end of a helium distribution conduit, with the inlet end (not shown) connected to a source of helium gas. At left is a captured image taken at image plane IP, in which the helium was not activated and no helium gas was observed emanating from the tip 40. At right is another captured image taken at image plane IP, in which the helium distribution conduit was opened such that helium gas was flowing from the tip 40. The resulting dual flows of helium gas were clearly observed as a contrast variation CV2 in object plant OP, which was recorded at the image plane IP. From this experiment, it is shown that the location and extent of a leak of comparable magnitude from a device under test (DUT) would be similarly detectable by leak detection system 10.

Turning to FIG. 6, shows one exemplary device under test (DUT) 50 which can be evaluated by leak detection system 10. DUT 50 includes top module 52, which may be a layer of glass for example, and bottom module 54, which may be a metal or plastic casing for example. Frame 56 may be disposed between the top module 52 and the bottom module 54, such that a sealed interior space (i.e., volume) is created within DUT 50.

To hermetically seal the interior space, beads of sealant/adhesive 58A and 58B may be placed between frame 56 and top and bottom modules 52, 54 respectively. Beads 58A and 58B may extend around the entire periphery of the abutting contact between frame 56 and top and bottom modules 52, 54, respectively, such that no air or water can flow into or out of the hermetically sealed space. However, beads 58A and/or 58B may not be uniform or continuous, such as in the case of manufacturing or automation defects. As noted above, leak detection system 10 can be utilized to identify, assess and characterize any leaks which may occur in DUT 50.

As depicted in FIG. 6, a motive flow 60 of pressurized gas may be induced within the sealed interior chamber of DUT 50. For example, the interior chamber may be pressurized, such as via an incoming flow of gas through a port formed in top module 52, bottom module 54 or frame 56. The interior pressure induces a flow F1 outwardly, via one or more leaks L1, L2 if leak paths are present. These leaks L1 and/or L2 may be detected using leak detection system 10, as described in detail above. In particular, system 10 allows an evaluator to identify the location, magnitude, and character of leaks L1 and/or L2, which in turn allows the evaluator to more easily identify the root cause of leaks L1 and/or L2, such as the composition, application or location of adhesive beads 58A and/or 58B, for example.

In an exemplary embodiment, the source of pressurized gas may provide a motive flow 60 of a gas having a refractive index different than ambient air. For example, the motive flow 60 may be made up of a gas having a refractive index 0.000161, 0.000257 or 0.000707 larger or smaller than ambient air at $\lambda=589$ nm, 0° C. and 1 atm. A refractive index sufficiently larger or smaller ensures that the gas is visually distinguished from the surrounding air when imaged as described herein. Exemplary gasses having a suitably high or low refractive index include carbon dioxide, helium, and difluoroethane. Through the use of motive flow 60 with a refractive index different than air as described herein, signal strength may be increased at least 10 times, and as much as 100 times, as compared to a motive flow 60 including air alone.

Figure 22:
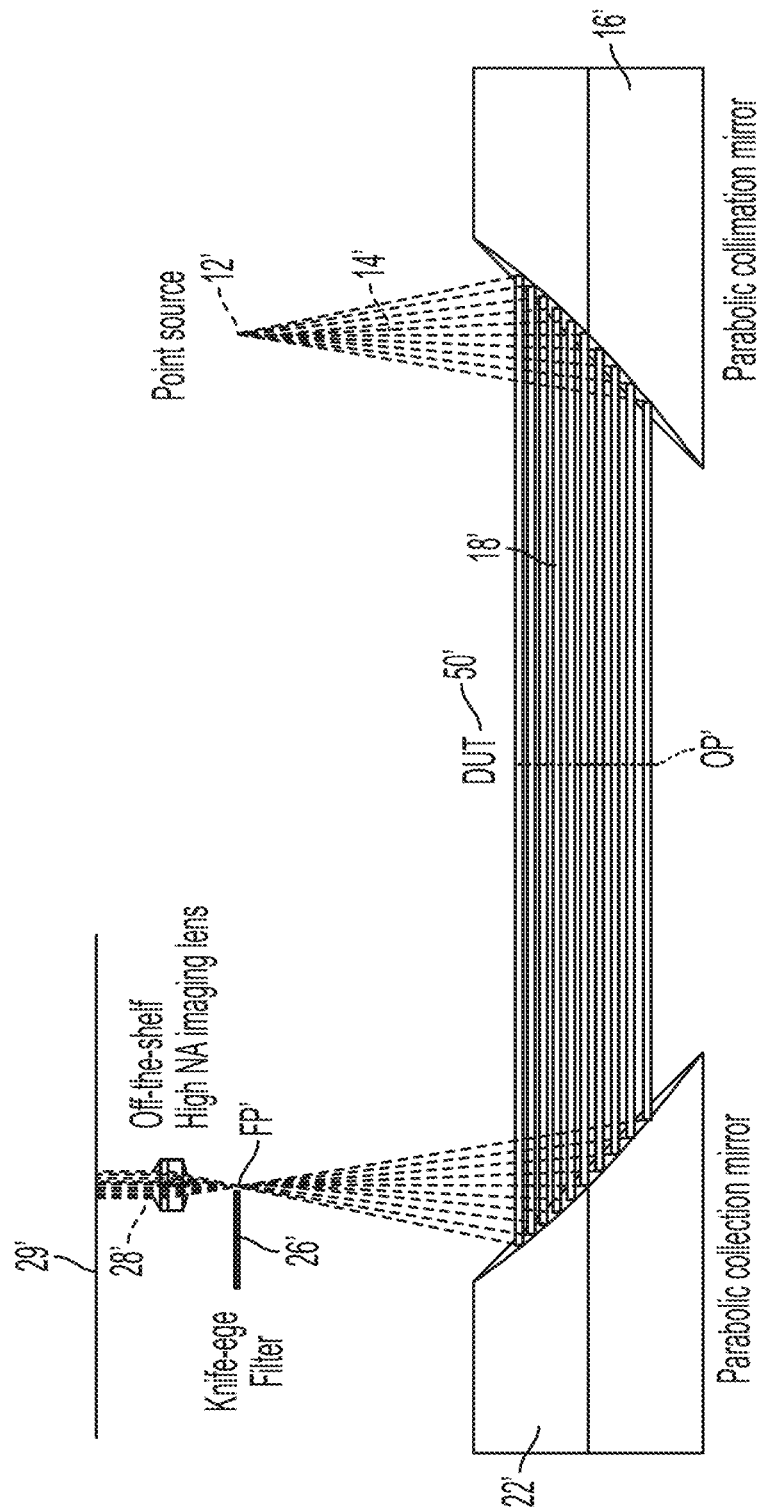
FIG. 22 is a schematic view of another leak detection system in accordance with the present disclosure, utilizing two parabolic mirrors to collimate and collect light from a light source.
Figure 23:
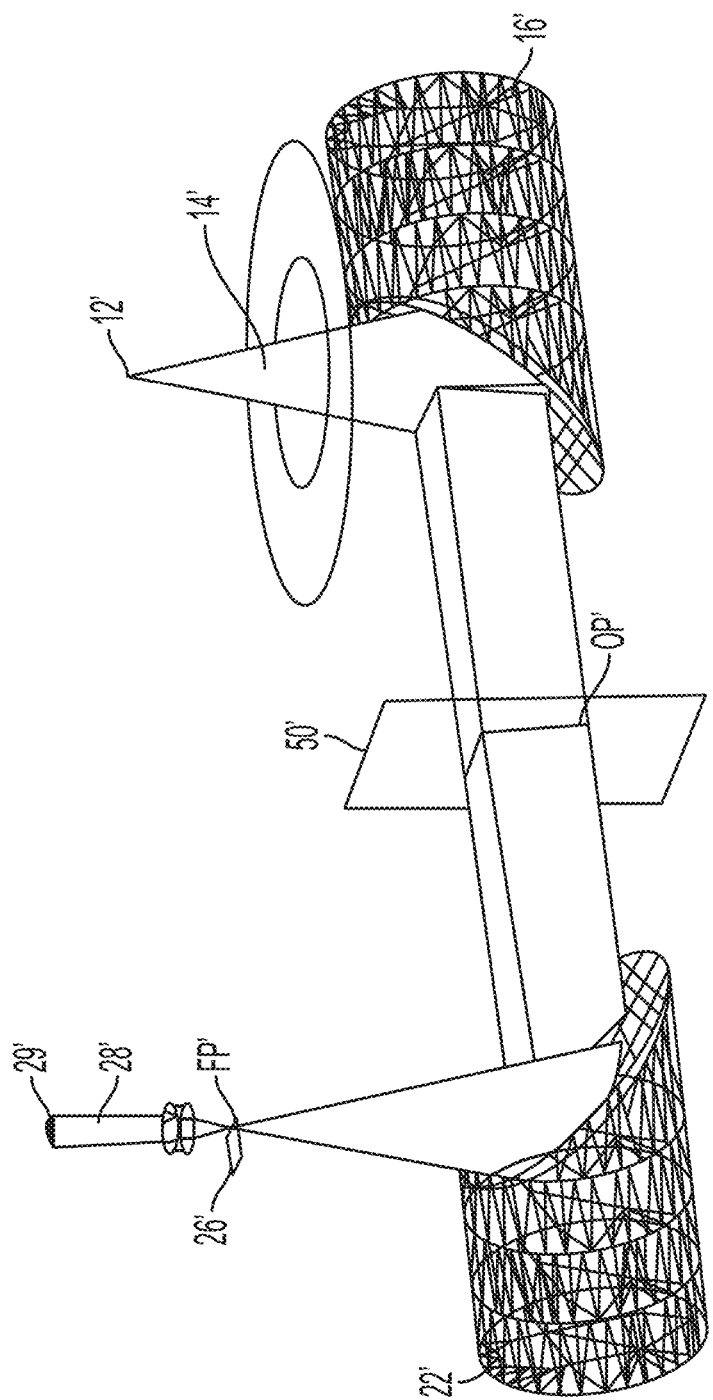
FIG. 23 is a perspective view of the leak detection system of FIG. 22.

Turning now to FIGS. 22 and 23, an alternative leak detection system 10' is shown. Leak detection system 10' operates similarly to leak detection system 10, and has similar structures and configuration as leak detection system 10 except otherwise indicated. Structures of leak detection system 10 have the same reference numbers as corresponding structures in leak detection system 10', except with a prime added to the number as shown.

However, leak detection system 10' does not include 4F imaging system 20, and instead utilizes parabolic collection mirror 22' and parabolic collimation mirror 16'. Parabolic collection mirror 22' and parabolic collimation mirror 16' are larger than lenses 22 and 24, and collimation lens 16, allowing mirrors 16', 22' to have shorter focal length with minimized spherical aberration compared to the single element spherical lenses 16, 22, and 24 (FIG. 1) with the same size. This substitution allows leak detection system 10' to cover a larger area of a DUT 50' (which may be identical to DUT 50), with larger diameter lens and a smaller overall spatial footprint. In addition, leak detection system 10' utilizes a conventional high numerical aperture imaging lens 29' to directly image the DUT 50' in combination with having two parabolic mirrors 16' and 22' without satisfying the spatial requirements needed to utilize the 4F imaging system 20.

Figure 24:
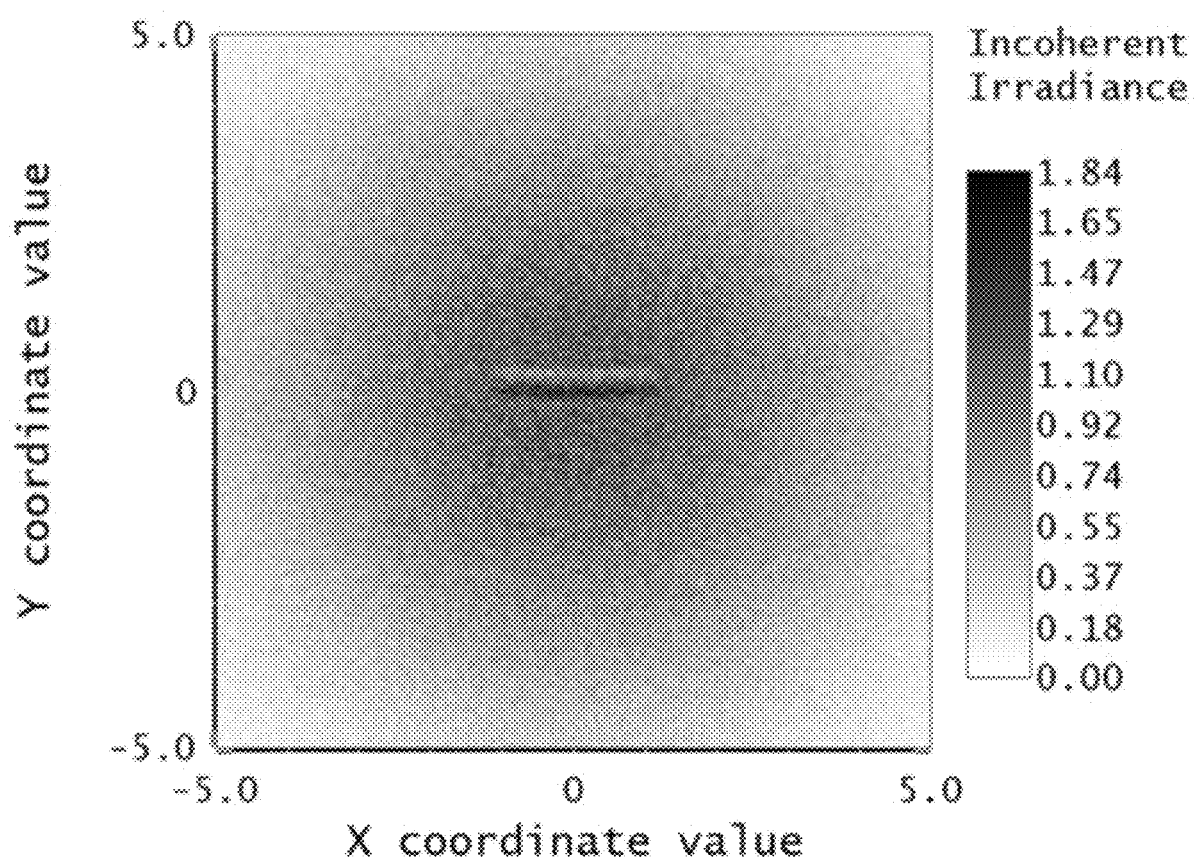
FIG. 24 is a photograph of a model leaking module, taken from monitoring via the leak detection system of FIG. 22.

For example, FIG. 24 shows a photograph image illustrating simulation results of imaging when a gas leak is modelled by an object plane OP' in a DUT 50' with small refractive index changes. To produce the photograph of FIG. 24, leak detection system 10' of FIGS. 22 and 23 was used as described above to examine the intentional leak created in the DUT 50'. Similar to the results shown in FIG. 3, spatial filtering clearly creates contrast variation in the image at the center of the image.

Figure 7:
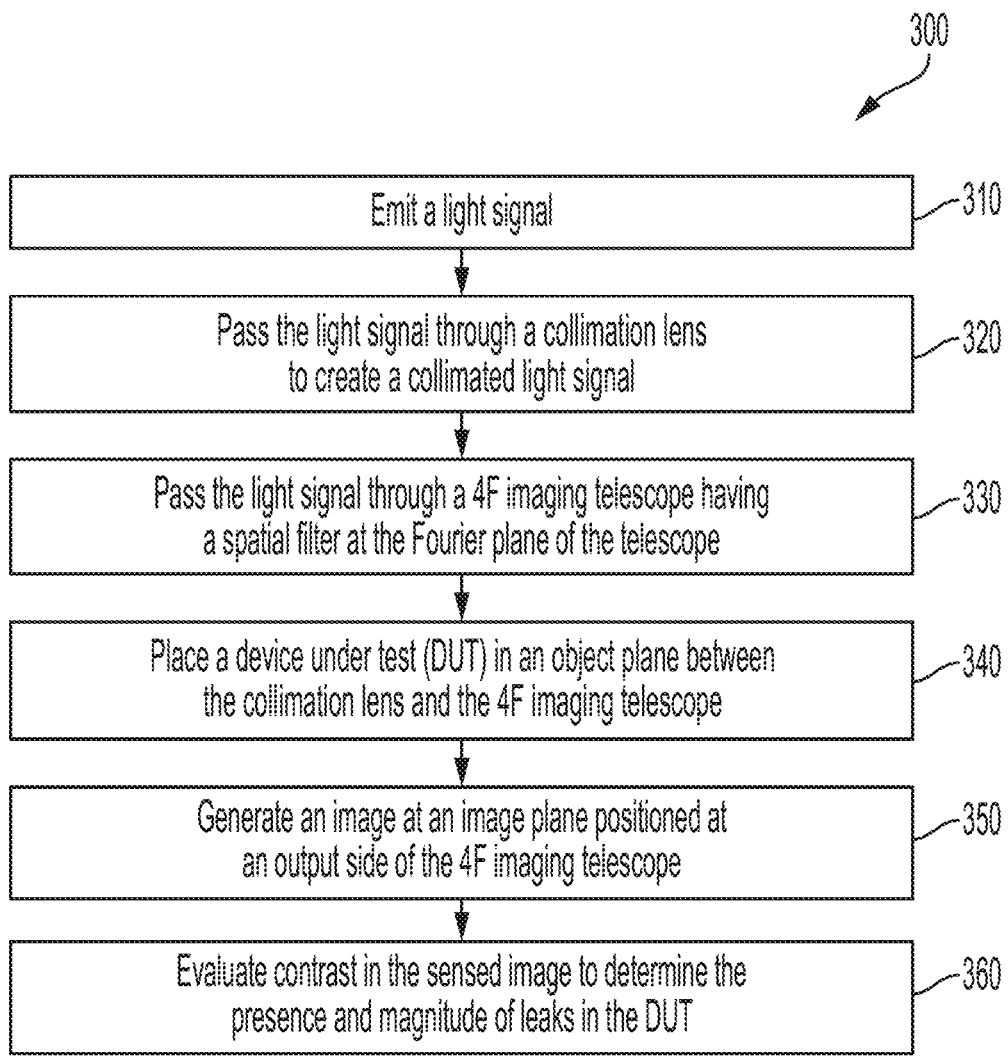
FIG. 7 is a flowchart showing a method of leak detection in accordance with the present disclosure.

FIG. 7 illustrates an exemplary method for detecting and evaluating leaks in a device under test, such as DUT 50 (FIG. 6). This method 300 may be performed by a human user of a system made in accordance with the present disclosure, or may be automated through the use of a computer or controller as further described below.

FIG. 7 shows a method of generating and evaluating a sensed image using a system, such as system 10, in accordance with the present disclosure. Beginning with step 310, a coherent or incoherent light signal is emitted, such as by applying electrical power to a light source to generate light signal 14. In an exemplary embodiment, the light signal is a laser or LED signal coming from light source 12. In step 320, at least a portion of the light signal is passed through a collimation lens, such as lens 16, to create a collimated light signal, such as signal 18.

In step 330, at least a portion of the collimated light signal is passed through a 4F imaging telescope, such as telescope 20. As the light signal passes through telescope 20, the signal is filtered by a spatial filter, such as spatial filter 26 described above. At this point, system 10 is ready to be used for evaluation of a device under test (DUT), such as DUT 50 shown in FIG. 6.

In step 340, a DUT is placed into an object plane between the collimation lens and the 4F imaging telescope, illustratively object plane OP shown in FIG. 1. The DUT may be rotated, translated or otherwise reoriented to view different surfaces and areas of the DUT. In an exemplary embodiment, the DUT may be moved systematically along a series of motions to establish a "grid" or other systematic series of evaluated areas, such that the entirety of the surface of interest in the DUT are subjected to leak evaluation.

In step 350, an image is generated at an image plane positioned at an output side of the 4F imaging telescope, such as image plane IP shown in FIG. 1. In step 360, the contrast in this sensed image may then be evaluated to determine the presence and magnitude of leaks in the DUT.

Images detected by imaging device 29 are evaluated by a controller. The controller may be microprocessor-based and includes a non-transitory computer readable medium which includes processing instructions stored therein that are executable by the microprocessor of controller to evaluate the detected image to evaluate the presence and/or extent of a leak L1, L2 by assessing the presence or absence of contrast variation CV1 and/or CV2 (FIGS. 4 and 5). A non-transitory computer-readable medium, or memory, may include random access memory (RAM), read-only memory (ROM), erasable programmable read-only memory (e.g., EPROM, EEPROM, or Flash memory), or any other tangible medium capable of storing information.

The image generated by the present system (such as systems 10 or 10') may be processed by software designed to detect and evaluate contrast variation and determine the defect size and generate scores corresponding to the presence, magnitude and character of any leaks L1, L2 (FIG. 6). Both conventional image processing and machine learning techniques can be used to implement this software, including using the methods described in detail below.

Figure 9:
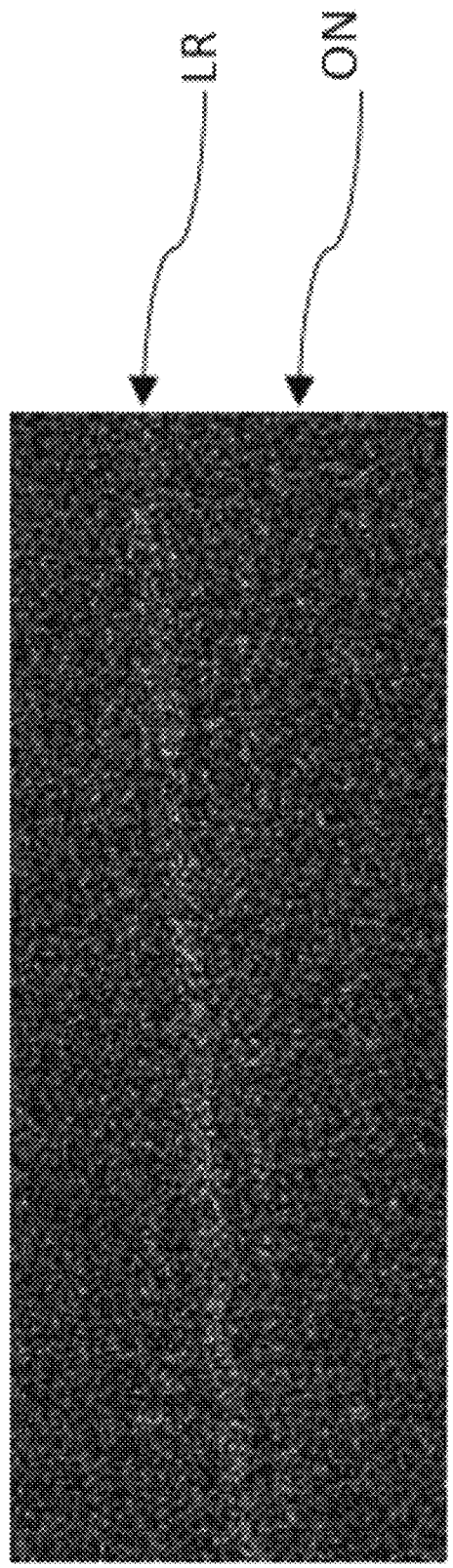
FIG. 9 is a background subtracted image for a device under test with a small leak detected via a leak detection system in accordance with the present disclosure.
Figure 10:
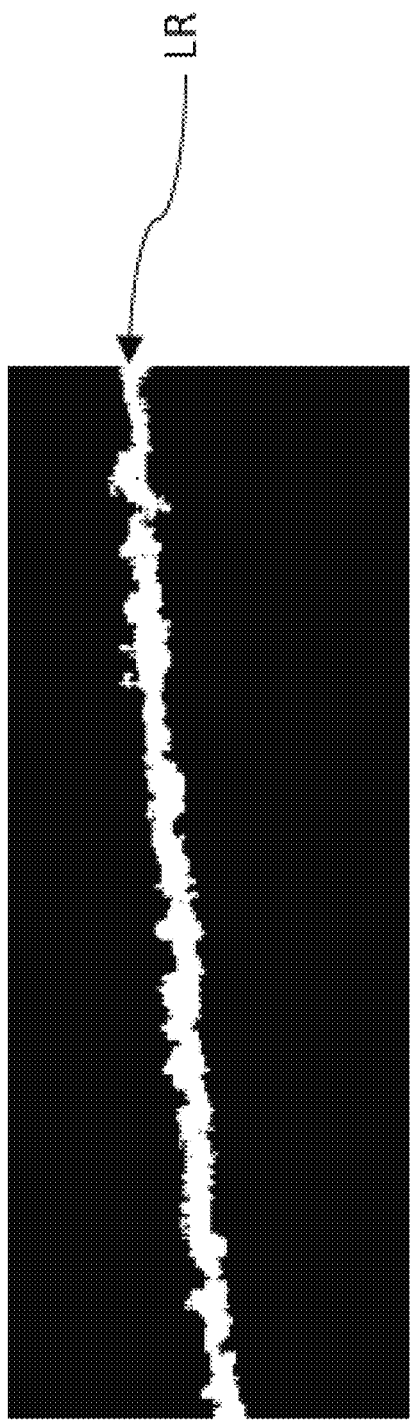
FIG. 10 is a depiction of the image shown in FIG. 9, after filtering via an optical noise filtering system.

Exemplary images which may be generated by systems 10 or 10' are depicted in FIGS. 9 and 10. In order to generate these images, spatial filtering may be applied to the raw image sensed by an imaging device (such as device 29 or 29') to more clearly show the size, location and characteristics of leaks in images sensed by, e.g., the images developed by system 10 at step 360 of FIG. 7. Generally speaking, optical leaks detected by system 10 would not be expected to present as isolated pixels in the image. The leaky regions, such as leaky region LR shown in FIGS. 9 and 10, will instead present as a cluster of pixels that connect to the DUT 50. Compared to the optical noise, such as optical noise ON, the leaky region LR will have high intensity variation in the resulting background-subtracted image (FIG. 9).

Figure 8:
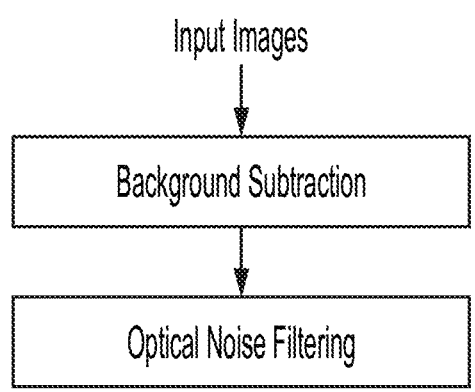
FIG. 8 is a flowchart showing a method of eliminating the impact of optical noise in accordance with the present disclosure.

Further modification may be made to the image to more clearly show a leak, in view of the above two properties. In an exemplary embodiment, a spatial filtering software using the method disclosed in FIG. 8 can eliminate the impact of optical noise on the background-subtracted image to arrive at an optical noise filtered image, as shown in FIG. 10. For instances where optical noise ON makes it difficult to detect small leaks in the DUT 50, the present optical noise filtering allows for leaky region LR to be highlighted and easily discerned, as shown in FIG. 10. Thus, the impact of optical noise ON is eliminated though the optical noise filtering software. Further details of noise filtering software and systems are further described herein.

Figure 11:
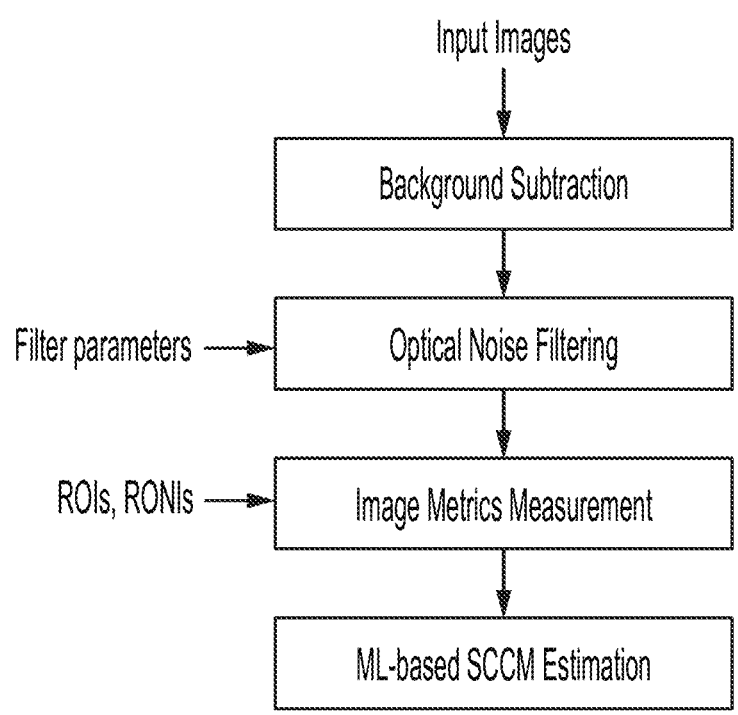
FIG. 11 is a flowchart showing a method of analyzing an image which has undergone optical noise filtering in accordance with the preset disclosure.

As illustrated in FIG. 11, a method of image modification and interpretation may be used to identify and characterize leaks. In the illustrated method, input images are first subject to background subtraction as described herein (e.g., with reference to the image of FIG. 9). The resulting background subtracted image then undergoes optical noise filtering, with the optical noise filtering system optionally further including user-modifiable parameters which can be tuned and optimized to detect large leaks and/or small leaks in the DUT 50 as further discussed below. After the step of optical noise filtering, an image such as shown in FIG. 10 may be generated.

From the optical noise filtered image (e.g., of FIG. 9), the method may utilize image metrics measurement for specific leaky regions or types of leaky regions, if multiple. These regions can be segmented out for separate classification. For each of the leaky regions, image metrices representing the severity of each leak can be computed. Thus, within one DUT 50 (FIG. 6), the spots with large leaks and the spots with small leaks can be independently located and classified.

Some of the image metrices representing the optical leaks include size of the leak in terms of number of pixels, and average pixel-intensity of the leak. Furthermore, a single leaky region can be further analyzed by splitting it into two. This would allow the software to quantify the leaky regions through image metrices such as number of leaks (FIG. 12A), width of leaks (FIG. 12B), length of leaks (FIG. 12C), leakage travel area (FIG. 12D), and various gradient-based metrics.

Figure 12A:
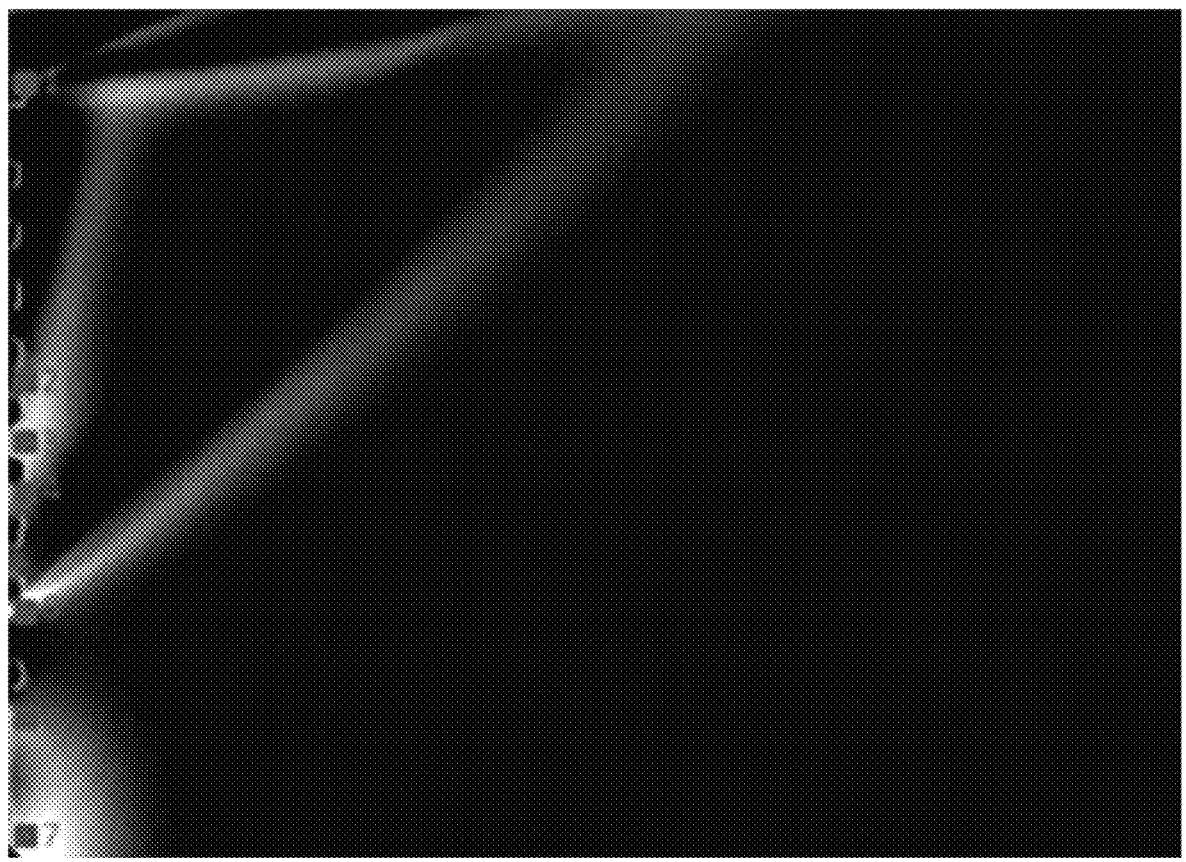
FIG. 12A is a photograph which has been analyzed in accordance with the method of FIG. 11 to indicate a number of leaks detected.
Figure 12B:
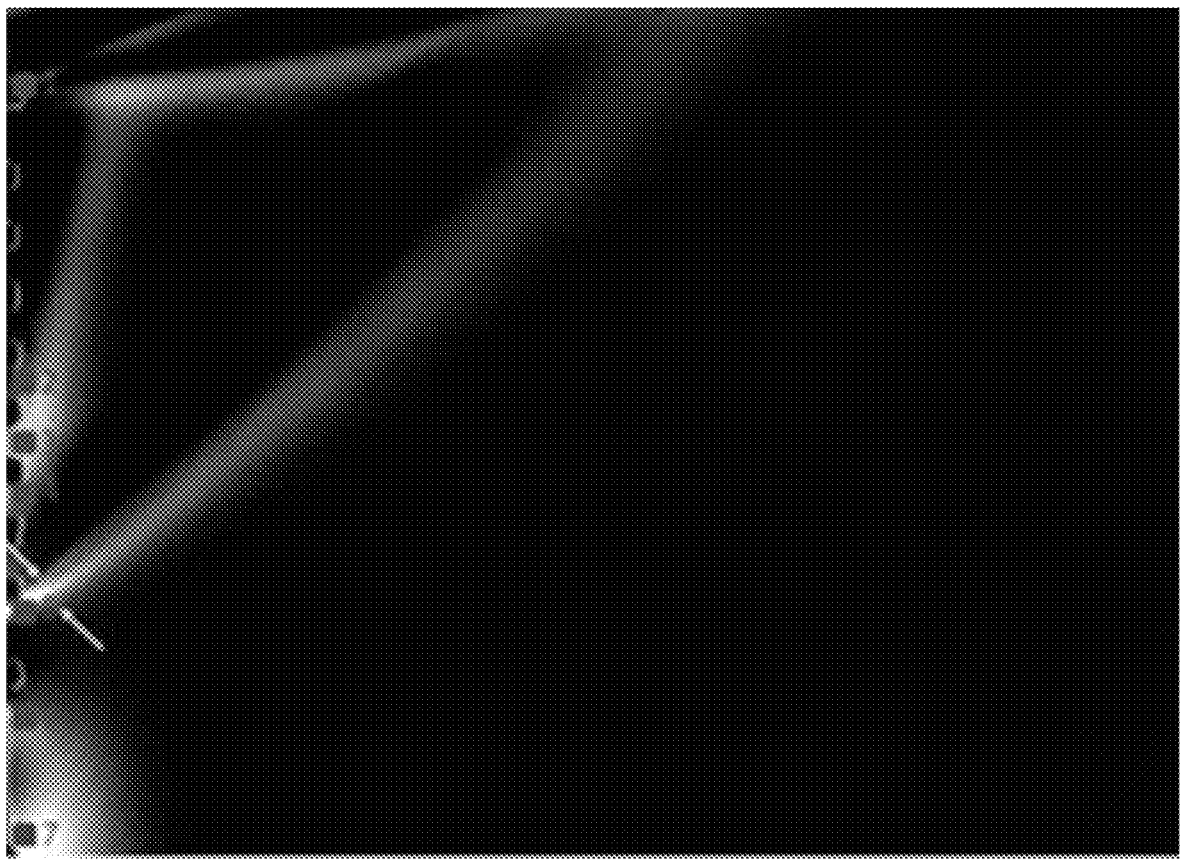
FIG. 12B is another view of the photograph of FIG. 12A, illustrating the results of additional analysis to indicate leakage width.
Figure 12C:
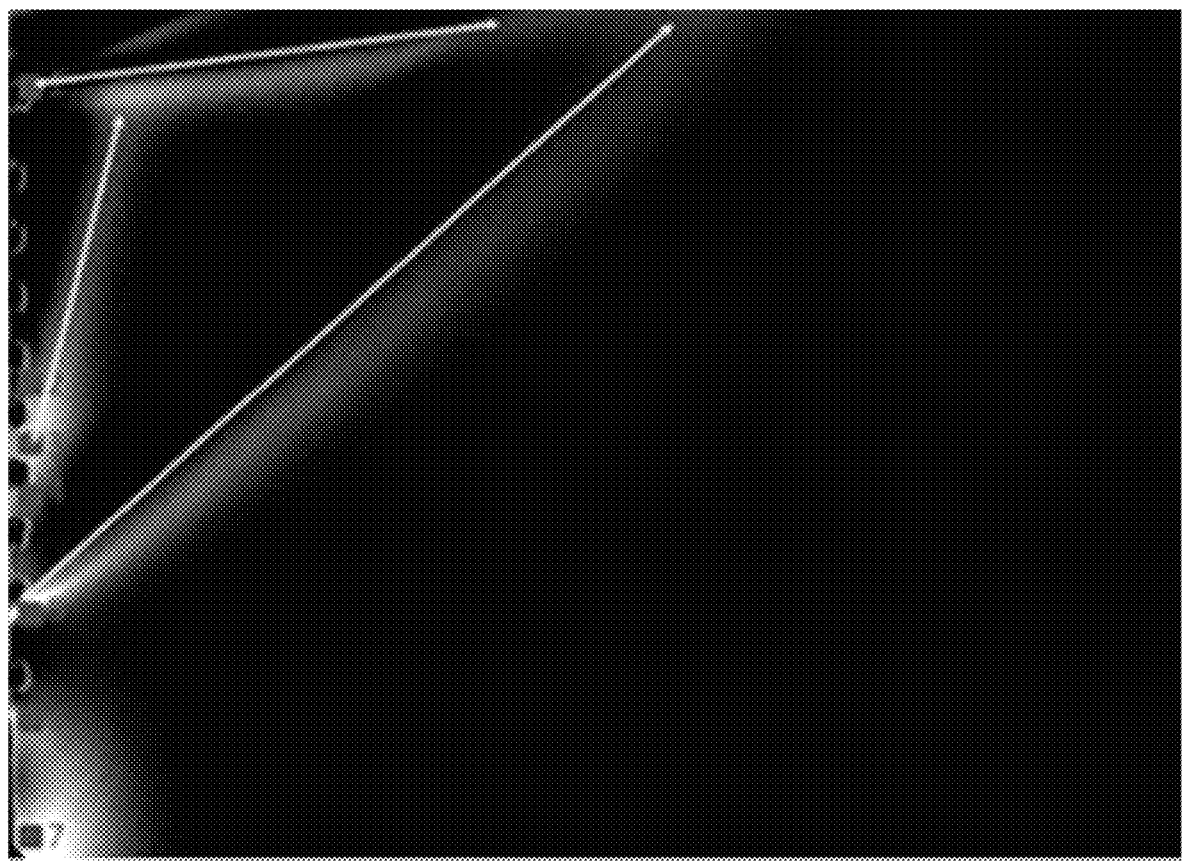
FIG. 12C is another view of the photograph of FIG. 12A, illustrating the results of additional analysis to indicate leakage length.
Figure 12D:
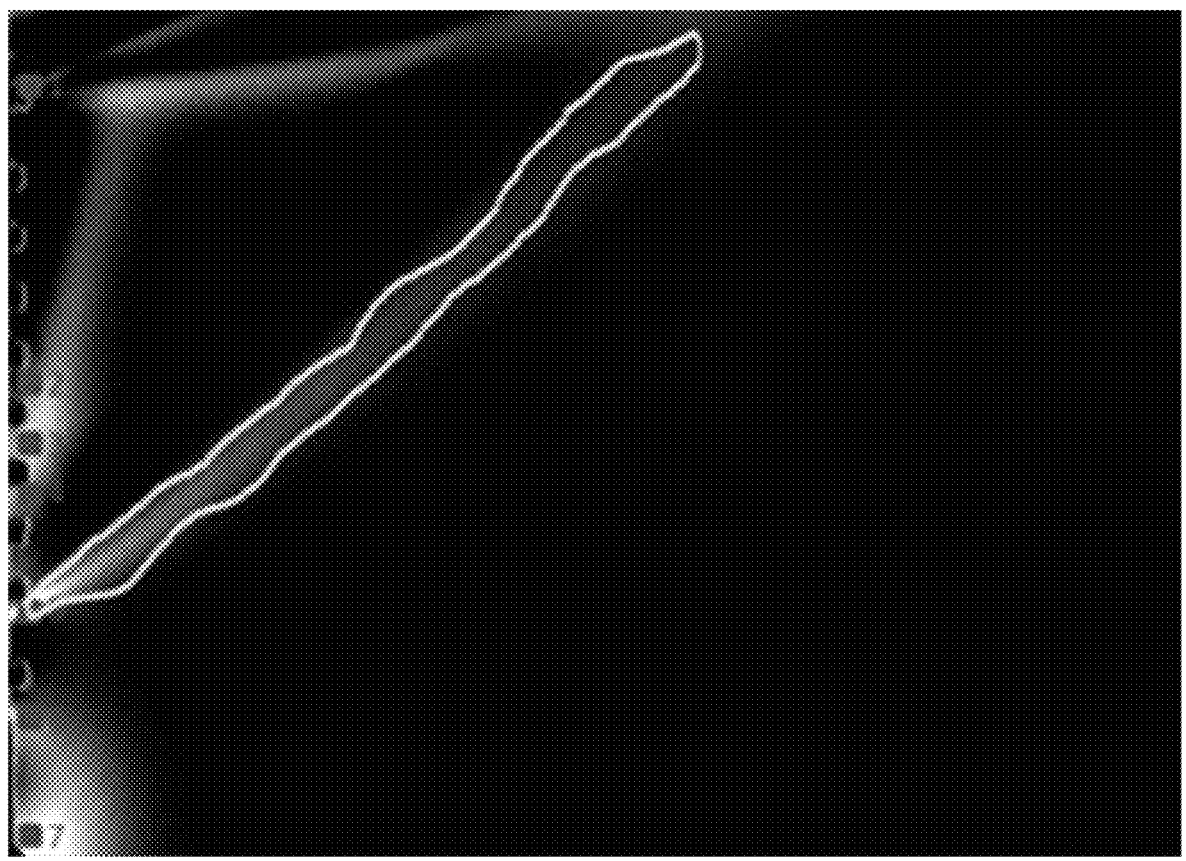
FIG. 12D is another view of the photograph of FIG. 12A, illustrating the results of additional analysis to indicate leakage area.

FIG. 12A indicates number of leaks by placing an indicator, such as dots on the points of origination of the leak and totaling the number of indicators present in the after-analyzed image. FIG. 12B indicates the width of leaks by placing indicators, such as arrows, on the outer perimeter of the leakage trail and measuring the distance between indicators. FIG. 12C indicates length of leaks by placing indicators, such as arrows, along the entire length of the leak and measuring the length of the indicator. FIG. 12D indicates area of leak by drawing a line around the perimeters of the leak and calculating the area of the indicator shape.

In one exemplary embodiment, the optical noise filtered image can be divided into "grids" and the image metrices on each grid can be computed. Inferences based on the relative difference between the grid values is also contemplated for use in connection with the present system and method.

In some applications only a portion of the DUT 50 needs to be inspected. Using the present system, a user may define a particular Region-of-Interest (ROI) in the DUT 50, as shown in FIG. 11. The optical leak in that region alone can then be inspected and measured during the step of image metrics measurement, as described in detail herein.

In addition, one or more Regions-of-Non-Interest (RONI) can also be defined in the DUT 50 as shown in FIG. 11. For example, the region closer to the DUT boundary can be expected to have higher pixel intensities due to high pressure. But these cannot be inferred as leak regions since the high pressure normally associated with a leak are also present at non-leaking boundary areas. So, the boundary area may be designated as a Region-of-Non-Interest (RONI), and the contributions from such RONI can be suppressed through imaging operations designed to exclude the RONI from the overall analysis of the DUT 50.

The leak detection and optical noise filtering software can further employ a machine learning (ML) based estimation designed to determine leak location and a volumetric leak rate in Standard Cubic Centimeters per Minute (SCCM). Similarly, and as further discussed below, a deep learning (DL) regression model may be used in place of the ML model.

Figure 13:
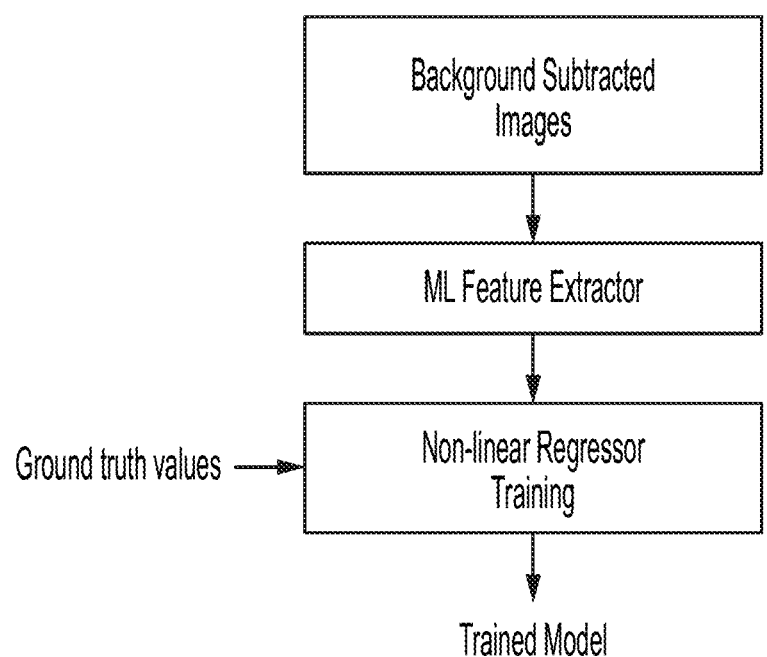
FIG. 13 is a flowchart showing a method of optical leak testing as a machine learning regression problem in the training phase.
Figure 14:
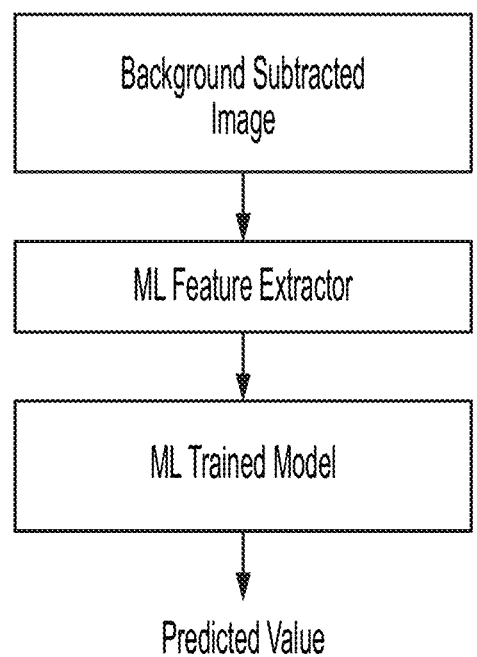
FIG. 14 is a flowchart showing a method of optical leak testing as a machine learning regression problem, illustrating the testing phase.

Turning now to FIGS. 13 and 14, the ML and DL model may be defined by the following equation:

$$SCCM_{i,j} = \sum_{i-\text{Inspection Interval}}^{i} \sum_{j-fps}^{j} \text{Estimated Leak at each frame}$$

In this equation, fps corresponds to the frames per second of the camera and $SCCM_{i,j}$ corresponds to the SCCM at the $i^{th}$ second and $j^{th}$ frame.

As shown in FIG. 13, in the training phase, the background subtracted images and the corresponding ground truth cubic centimeters are provided for training. The optical noise filtering software, described herein, can also be applied on the background subtracted image prior to training. From the given input images, the features are extracted and using the ML/DL regression model, the system is trained. Turning to FIG. 14, in the testing phase, from the given background subtracted image, the same features are extracted and fed to the trained ML/DL regression model. The model predicts the cubic centimeters value for each frame. The disclosed ML/DL model is trained to predict the leakage on each video frame. Then the predicted values are agglomerated to compute the corresponding SCCM value at an instant of time.

Figure 15:
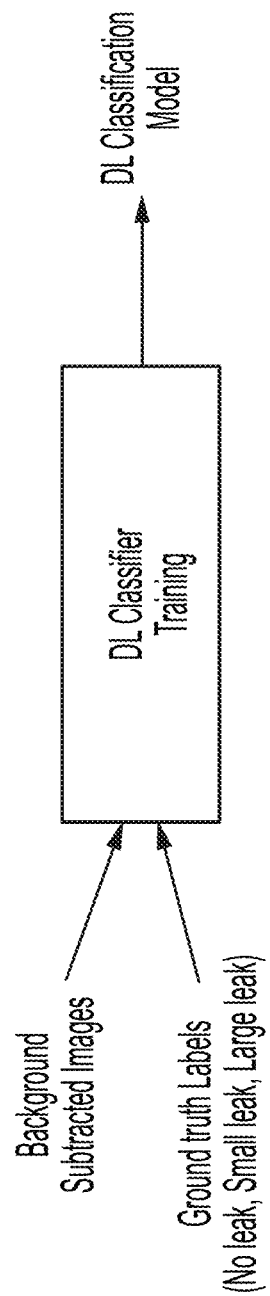
FIG. 15 is a flowchart showing a method of optical leak testing as a deep learning classification problem, illustrating the training phase.
Figure 16:
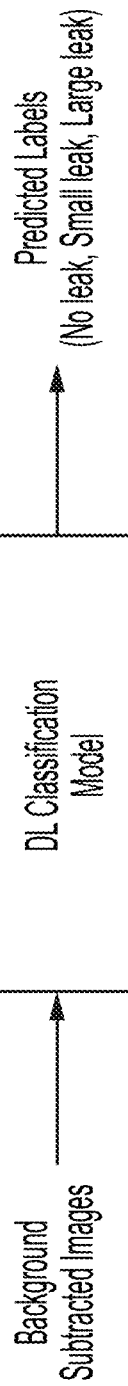
FIG. 16 is a flowchart showing the method of optical leak testing as a deep learning classification problem of FIG. 15, illustrating the testing phase.

As illustrated in FIGS. 15 and 16, the optical noise filtering software can also be modeled as a classification problem. As shown in FIG. 15, the training phase would include the background subtracted images and the corresponding ground truth labels, such as "no leak," "small leak" or "large leak." A test DUT is provided with the designated leak characteristics, such as a "No Leak DUT," a "Small Leak DUT" or a "Large Leak DUT" and its ground truth label is associated with its leak characteristics. The resulting data is developed into the output DL Classification Model. Prior to training, the optical noise filtering software can also be applied on the background subtracted image as described herein.

Turning to FIG. 16, in the testing phase, the trained deep learning classification model output from the method of FIG. 15 is used as the processing model for a background subtracted image for a DUT 50. The image is uploaded to the DL Classification Model and a Predicted Label is output showing whether the DUT 50 is a no-leak, small-leak or large-leak device.

Figure 17:
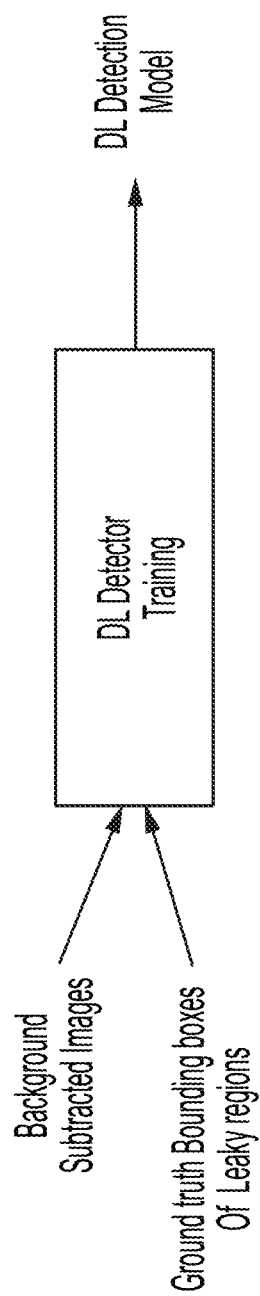
FIG. 17 is a flowchart showing a method of optical leak testing as a deep learning detector problem, illustrating the training phase.
Figure 18:
FIG. 18 is a flowchart showing the method of optical leak testing as a deep learning detector problem of FIG. 17, illustrating the testing phase.

Alternatively, as illustrated in FIGS. 17 and 18, the optical noise filtering software can also be modeled as a detection problem. As shown in FIG. 17, in the training phase, the background subtracted images and corresponding ground truth bounding boxes of known leaky regions are provided for training. Prior to training, the optical noise filtering software can also be applied to the background subtracted image as described herein. The bounding boxes represent the leaky regions known to exist in the image. The output of the training system is the DL Detection Model.

Turning to FIG. 18, in the testing phase, the trained deep learning detection model output from the method of FIG. 17 is used as the processing model for a background subtracted image for a DUT 50. The image is uploaded to the Detection Model and one or more Predicted Bounding Boxes is showing the leaky regions of the DUT 50.

Figure 19:
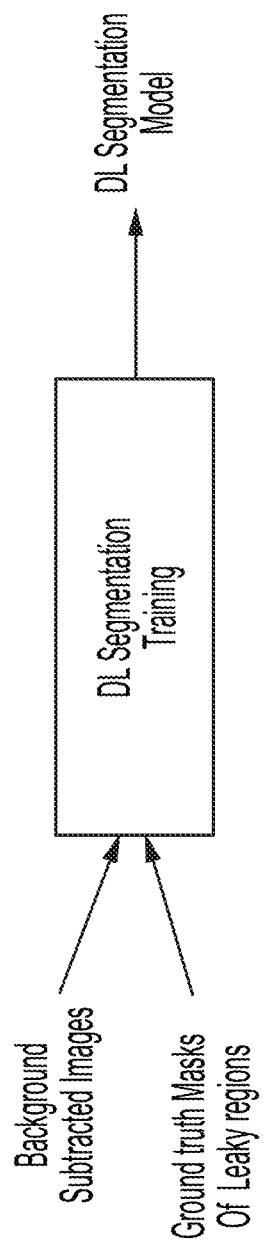
FIG. 19 is a flowchart showing another method of optical leak testing as a deep learning segmenter problem, illustrating the training phase.
Figure 20:
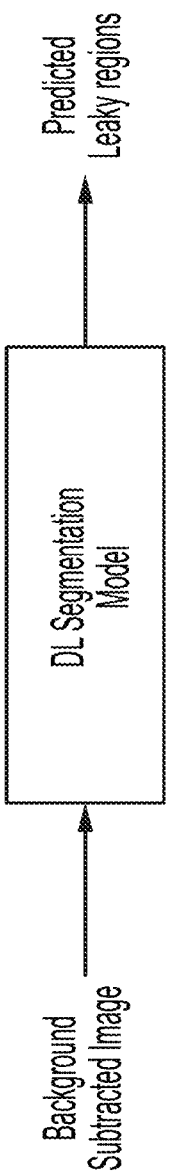
FIG. 20 is a flowchart showing the method of optical leak testing as a deep learning segmenter problem of FIG. 19, illustrating the testing phase.

In another alternative, illustrated in FIGS. 19 and 20, the optical noise filtering software could be modeled as a segmentation problem. As shown in FIG. 19, in the training phase, the background subtracted images and corresponding ground truth binary mask images (e.g., as shown in FIGS. 9 and 10) are provided for training. Prior to training, customized optical noise filtering can also be applied on the background subtracted image, such as the filtering shown and described in connection with the method of FIG. 11. The binary mask images represent the known leaky regions in the image as white pixels and the other regions as black pixels. The output of this DL Segmentation Training is the DL Segmentation Model.

Turning to FIG. 20, in the testing phase, the trained Segmentation Model output from the method of FIG. 19 is used as the processing model for an image from a DUT 50. Predicted Leaky regions of the DUT 50 are output, with associated exact (i.e., binary) boundaries are obtained as the output of the DL Segmentation Model. Using this model, the leakage width, leakage length and the leakage travel area can be computed as described above with respect to FIGS. 12A-12D, for example.

Figure 21A:
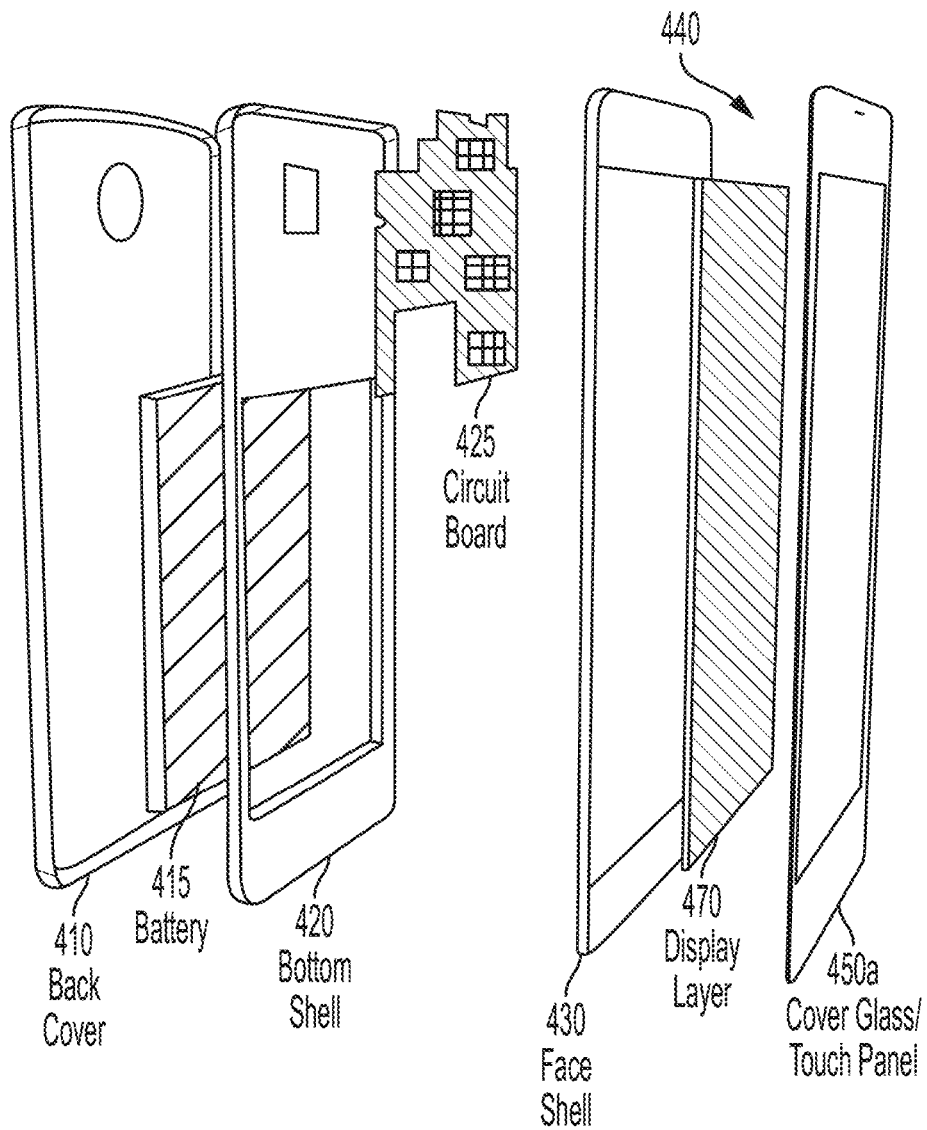
FIG. 21A is a perspective, exploded view of an exemplary display module in accordance with the present disclosure.
Figure 21B:
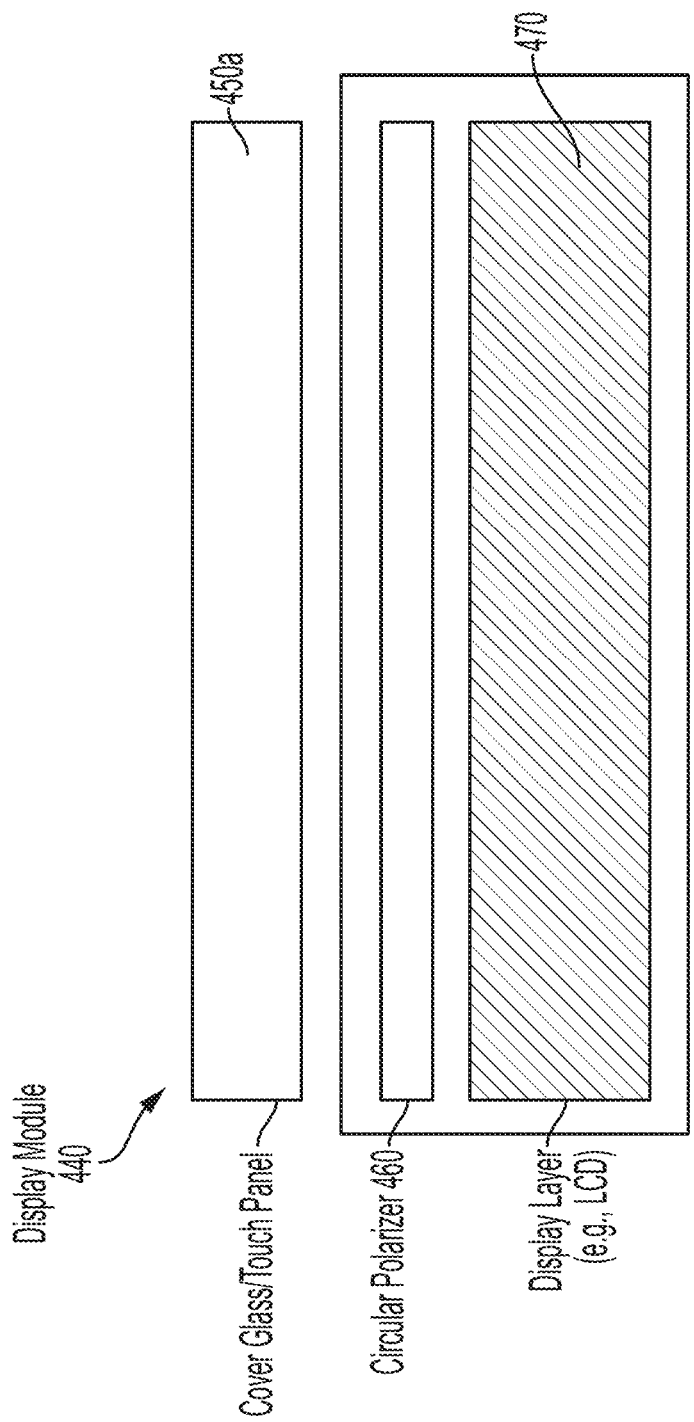
FIG. 21B is a schematic view of the display module shown in FIG. 21A.

In one exemplary embodiment DUT 50 may be a mobile phone, tablet, or other handheld display device, and system 10 is used to evaluate a hermetically sealed casing around the mobile phone or tablet. For example, FIG. 6 schematically illustrates a portion of a mobile phone. When interfacing together all of the various components, the mobile phone is configured in a convenient package suitable for handling by human hands. A tablet may be configured similarly to the phone, except with larger overall dimensions. For example, as shown in FIGS. 21A and 21B, an exemplary mobile phone 400 includes a back cover 410. A bottom shell 420 is interfaced with a face shell 430 to protect the circuit board 425 that is configured to provide functionality to the mobile phone 400. The bottom shell 420 is configured to support a battery 415, and is further configured to interface with the back cover 410. The face shell 430 is configured to interface with and support a display module 440. When fully assembled, the display module 440 includes a display layer 470 and cover glass/touch panel 450a. The cover glass/touch panel 450a is configured as a transparent material or transparent optical material.

Generally speaking, DUT 50 may be any device that is configured to be hermetically sealed, such that an understanding of the presence and character of leaks can be used to determine whether the hermetically sealed configuration has been achieved in fact with any given device sample. Devices configured to be hermetically sealed may include mobile phones and tablets, ad discussed above, as well as other devices such as smart watches and ear phones, or any other types of electrical components that require tight sealing.

The display module 440 includes a display layer 470, such as a liquid crystal display (LCD), a circular polarizer 460, and optically transparent cover glass/touch panel 450a. In some configurations, the circular polarizer 460 may be integrated within the display layer 470 as is shown by the dotted outline surrounding both the display layer 470 and circular polarizer 460. The display layer 470 is configured to provide a visual interface with a corresponding user, such as by displaying images that are viewable by the user. The display layer 470 may include one or more additional layers, as required or desired for a particular application. Various technologies are used to build the display layer 470 typically configured as pixels providing colored light that are viewable by a user. These technologies include liquid-crystal displays (LCDs), light-emitting diodes (LEDs), organic light-emitting diodes (OLED), etc. The cover glass/touch panel 450a is located adjacent to the display layer 470 or the circular polarizer 460 that is associated with the display layer 470. Cover glass/touch panel 450a is configured as a user interface, wherein the user may interact with the mobile phone 400 and/or provide input control through touching the glass or panel 450a using a stylus or one or more fingers.

Other uses of the display module 440 and/or transparent optical material 450a are contemplated, such as any mobile devices with display screens, television screens, computer monitors, tablet devices, integrated display screens (e.g., integrated into dash of vehicle, desk surface, panel, etc.), portable communication devices, etc.

In particular, bottom shell 420, face shell 430, back cover 410, and/or cover glass 450a may cooperate to form a hermetically sealed interior space to contain and protect internal components, including battery 415, circuit board 425, polarizer 460 and display layer 470, for example. Embodiments of the present disclosure, including leak detection system 10 described in detail above, are configured to detect and/or measure any leaks from this hermetically sealed interior space.

While this invention has been described as having exemplary designs, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

ASPECTS

Aspect 1 is an imaging system. The imaging system includes a point light source configured to emit a light signal; a parabolic collimation mirror positioned to receive the light signal the parabolic collimation mirror configured to emit a collimated light signal; a parabolic collection mirror positioned to receive the collimated light signal; a spatial filter positioned at a Fourier plane of the parabolic collection mirror, the spatial filter configured to pass a filtered light signal; an image sensor positioned at an output side of the parabolic collection mirror, such that the image sensor is positioned to receive the filtered light signal; a device under test positioned at an object plane between the parabolic collimation mirror and the parabolic collection mirror; and a source of pressurized gas configured to pressurize an interior volume of the device under test, whereby the imaging system is configured to optically detect a leak of the pressurized gas from the device under test.

Aspect 2 is the imaging system of Aspect 1, wherein the pressurized gas has a refractive index different from air.

Aspect 3 is the imaging system of either Aspect 1 or Aspect 2, wherein the device under test is configured as a hermetically sealed device.

Aspect 4 is the imaging system of any of Aspects 1-3, wherein the light signal is an incoherent light signal.

Aspect 5 is the imaging system of Aspect 4, wherein the incoherent light signal is emitted by a light-emitting diode.

Aspect 6 is the imaging system of any of Aspects 1-3, wherein the light signal is a coherent light signal.

Aspect 7 is the imaging system of Aspect 6, wherein the coherent light signal is emitted by a laser.

Aspect 8 is the imaging system of any of Aspects 1-7, wherein the image sensor is an imaging device operably connected to a controller programmed to evaluate a detected image to determine the presence of a leak by assessing the presence or absence of contrast variation in the detected image.

Aspect 9 is an imaging system. The imaging system includes a point light source configured to emit a light signal; a collimation lens positioned to receive the light signal, the collimation lens configured to emit a collimated light signal; a 4F imaging telescope positioned to receive the collimated light signal; a spatial filter positioned at a Fourier plane of the 4F imaging telescope, the spatial filter configured to pass a filtered light signal; an image sensor positioned at an output side of the 4F imaging telescope, such that the image sensor is positioned to receive the filtered light signal; a device under test positioned at an object plane between the collimation lens and the 4F imaging telescope; and a source of pressurized gas configured to pressurize an interior volume of the device under test, the imaging system configured to detect a leak of the pressurized gas from the device under test, whereby the imaging system is configured to provide optical leak detection for the device under test.

Aspect 10 is the imaging system of Aspect 9, wherein the gas has a refractive index different than ambient air.

Aspect 11 is the imaging system of Aspects 9 or 10, wherein the device under test is configured as a hermetically sealed device.

Aspect 12 is the imaging system of any of Aspects 9-11, wherein the light signal is an incoherent light signal.

Aspect 13 is the imaging system of Aspect 12, wherein the incoherent light signal is emitted by a light-emitting diode.

Aspect 14 is the imaging system of any of Aspects 9-13, wherein light signal is a coherent light signal.

Aspect 15 is the imaging system of Aspect 14, wherein the coherent light signal is emitted by a laser.

Aspect 16 is the imaging system of any of Aspects 9-15, wherein image sensor is an imaging device operably connected to a controller, the controller programmed with processing instructions to evaluate a detected image to determine the presence of a leak by assessing the presence or absence of contrast variation in the detected image.

Aspect 17 is a method for evaluating leaks in a device, the method including: emitting a light signal; modifying the light signal to create a collimated light signal; filtering the light signal to create a filtered light signal; sensing the filtered light signal to create a sensed image; placing a device under test in an object plane along the collimated light signal such that an image of the device under test appears in the sensed image; directing a pressurized gas into an interior volume of the device under test; evaluating contrast in the sensed image; and based on the step of evaluating contrast, determining whether the pressurized gas is leaking from the interior volume of the device under test.

Aspect 18 is the method of Aspect 17, wherein the pressurized gas has a refractive index different from air.

Aspect 19 is the method of either of Aspects 16 or 17, further comprising determining the magnitude and character of the leak in the device under test based on the contrast in the sensed image.

Aspect 20 is the method of any of Aspects 16-19, wherein the device under test is configured to be a hermetically sealed device.

Aspect 21 is the method of any of Aspects 16-20, wherein the step of emitting the light signal comprises emitting an incoherent light signal.

Aspect 22 is the method of any of Aspects 16-20, wherein the step of emitting the light signal comprises emitting a coherent light signal.

Aspect 23 is the method of any of Aspects 16-22, wherein the step of sensing the filtered light signal to create the sensed image comprises capturing the sensed image with an image sensor.

Aspect 24 is the method of Aspect 23, wherein the step of evaluating contrast in the sensed image is performed by a controller operably connected to the image sensor.

Aspect 25 is a method for evaluating a detected image, the method comprising: receiving a background-subtracted image; applying image metrices to measure and analyze the background subtracted image; recording and storing image measurements and analytics; and classifying aspects of the background subtracted image based on image metrices applied and measurements received.

Aspect 26 is the method of Aspect 25, the method further comprising dividing the background subtracted image into regions of interest and regions of non-interest.

Aspect 27 is the method of either of Aspects 25 or 26, wherein the classifying step further comprises predicting labels such as no leak, small leak, or large leak.

Aspect 28 is the method of any of Aspects 25-27, wherein the classifying step further comprises predicting leaky regions.

What is claimed is:

1. A method for evaluating leaks in a device, the method comprising:
   emitting a light signal;
   modifying the light signal to create a collimated light signal;
   filtering the light signal to create a filtered light signal;
   sensing the filtered light signal to create a sensed image;
   placing a device under test in an object plane along the collimated light signal such that an image of the device under test appears in the sensed image;
   directing a pressurized gas into an interior volume of the device under test;
   evaluating contrast in the sensed image; and
   based on the step of evaluating contrast, determining whether the pressurized gas is leaking through one or more leak paths from the interior volume of the device under test.

2. The method of claim 1, wherein the pressurized gas has a refractive index different from air.

3. The method of claim 2, further comprising determining the magnitude and character of the leak in the device under test based on the contrast in the sensed image.

4. The method of claim 1, wherein the device under test is configured to be a hermetically sealed device.

5. The method of claim 1, wherein the step of emitting the light signal comprises emitting an incoherent light signal emitted by a light emitting diode.

6. The method of claim 1, wherein the step of emitting the light signal comprises emitting a coherent light signal emitted by a laser.

7. The method of claim 1, wherein the step of sensing the filtered light signal to create the sensed image comprises capturing the sensed image with an image sensor.

8. The method of claim 7, wherein the step of evaluating contrast in the sensed image is performed by a controller operably connected to the image sensor.

9. The method of claim 1, wherein:
   the evaluating the contrast in the image comprises:
      receiving a background-subtracted image;
      applying image metrices to measure and analyze the background subtracted image; and
      recording and storing image measurements and analytics, and
   the determining whether the pressurized gas is leaking from the interior volume of the device under test comprises classifying aspects of the background subtracted image based on image metrices applied and measurements received.

10. The method of claim 9, the method further comprising dividing the background subtracted image into regions of interest and regions of non-interest.

11. The method of claim 9, wherein the classifying step further comprises predicting labels such as no leak, small leak, or large leak.

12. The method of claim 9, wherein the classifying step further comprises predicting leaky regions.

13. The method of claim 1, wherein the light signal is emitted by a point light source.

14. The method of claim 1, wherein the light signal is modified to a collimated light signal by a collimation lens positioned to receive the light signal.

15. The method of claim 1, further comprising receiving the collimated light signal at a 4F imaging telescope.

16. The method of claim 15, wherein the light signal is filtered to create the filtered light signal by a spatial filter positioned at a Fourier plane of the 4F imaging telescope.

17. The method of claim 15, wherein the filtered light signal is sensed to create the sensed image by an image sensor positioned at an output side of the 4F imaging telescope.

18. The method of claim 15, wherein the object plane where the device under test is placed is located between a collimation lens positioned to receive the light signal and the 4F imaging telescope.

* * * * *